US012783942B2

(12) United States Patent
Konishi et al.

(10) Patent No.: US 12,783,942 B2
(45) Date of Patent: Nov. 3, 2026

(54) MODEL EVALUATION DEVICE, FILTER GENERATING DEVICE, MODEL EVALUATION METHOD, FILTER GENERATING METHOD AND STORAGE MEDIUM

(71) Applicant: HONDA MOTOR CO., LTD., Tokyo (JP)

(72) Inventors: Shunsuke Konishi, Wako (JP); Takuma Kawahara, Wako (JP); Hidetoshi Utsumi, Wako (JP); Koji Sato, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 789 days.

(21) Appl. No.: 18/125,150

(22) Filed: Mar. 23, 2023

(65) Prior Publication Data

US 2023/0316140 A1 Oct. 5, 2023

(30) Foreign Application Priority Data

Mar. 31, 2022 (JP) ................................ 2022-060531

(51) Int. Cl.
*G06N 20/00* (2019.01)

(52) U.S. Cl.
CPC .................................... *G06N 20/00* (2019.01)

(58) Field of Classification Search
CPC .......... G06N 20/00; G06N 7/01; G06F 30/27; G01R 31/367; G01R 31/396
See application file for complete search history.

(56) References Cited

U.S. PATENT DOCUMENTS

2012/0290879 A1* 11/2012 Shibuya ............... G05B 23/021 714/26
2013/0085696 A1 4/2013 Xu et al.
(Continued)

FOREIGN PATENT DOCUMENTS

CN 106959420 7/2017
CN 113219341 8/2021
(Continued)

OTHER PUBLICATIONS

Japanese Office Action for Japanese Patent Application No. 2022-060531 mailed Dec. 19, 2023.
(Continued)

*Primary Examiner* — Cesar B Paula
*Assistant Examiner* — David Tan
(74) *Attorney, Agent, or Firm* — Amin, Turocy & Watson, LLP

(57) ABSTRACT

An aspect of the present invention is a model evaluation device including an acquisition part configured to acquire updated second auxiliary filter information in which first auxiliary filter information and second auxiliary filter information are updated through learning, the first auxiliary filter information being generated by a first processing based on data for generation which was used in generation of a mathematical model which predicts degradation of an analysis target, the second auxiliary filter information indicating a regulation of estimating a reliability of a prediction result by the mathematical model while using the first auxiliary filter information, and an evaluation part configured to evaluate an accuracy of prediction by the mathematical model while using the second auxiliary filter information in a case input-scheduled data which is scheduled to be input to the mathematical model is actually input to the mathematical model.

7 Claims, 15 Drawing Sheets

(56) References Cited

U.S. PATENT DOCUMENTS

| | | | | |
|---|---|---|---|---|
| 2013/0282626 | A1* | 10/2013 | White | G06F 40/00 706/11 |
| 2016/0116392 | A1* | 4/2016 | Carpenter | B01D 35/143 702/34 |
| 2023/0020146 | A1* | 1/2023 | Mizoguchi | G01R 31/3842 |
| 2023/0213585 | A1 | 7/2023 | Shimawaki et al. | |

FOREIGN PATENT DOCUMENTS

| | | |
|---|---|---|
| CN | 115698738 | 2/2023 |
| JP | 2013-516614 | 5/2013 |
| JP | 2016-073042 | 5/2016 |
| JP | 2019-105589 | 6/2019 |
| WO | 2011/024382 | 3/2011 |
| WO | 2020/149073 | 7/2020 |
| WO | 2021/112224 | 6/2021 |
| WO | 2021/241115 | 12/2021 |

OTHER PUBLICATIONS

Chinese Office Action for Chinese Patent Application No. 202310312085.6 mailed on Jun. 12, 2026.

* cited by examiner

MODEL EVALUATION DEVICE, FILTER GENERATING DEVICE, MODEL EVALUATION METHOD, FILTER GENERATING METHOD AND STORAGE MEDIUM

CROSS-REFERENCE TO RELATED APPLICATION

Priority is claimed on Japanese Patent Application No. 2022-060531, filed Mar. 31, 2022, the content of which is incorporated herein by reference.

BACKGROUND OF THE INVENTION

Field of the Invention

The present invention relates to a model evaluation device, a filter generating device, a model evaluation method, a filter generating method and a storage medium.

Description of Related Art

In recent years, in order to ensure access to affordable, reliable, sustainable and advanced energy for more people, research and development has been carried out on secondary batteries that contribute to energy efficiency (for example, see PCT International Publication No. 2020/149073).

SUMMARY OF THE INVENTION

Incidentally, in technologies related to secondary batteries, for example, various machine learning models have been proposed as techniques of predicting changes in degradation of battery capacities on the basis of usage data of lithium ion batteries. However, since the machine learning models are complicated mathematical models, although it is possible to construct a highly accurate mathematical model, over learning is likely to occur due to its complexity. For this reason, the prediction of a machine learning model may have a low accuracy for unknown data that has not been learned. As a result, in some cases, the reliability of a machine learning model with respect to a prediction accuracy becomes low.

Such a circumstance is not limited to a machine learning model of predicting degradation of a battery capacity of a lithium ion battery, but is shared by a mathematical model for predicting degradation of an analysis target.

The present application is intended to achieve provision of a technology that suppresses decrease in reliability of a mathematical model for predicting degradation of an analysis target. Further, by extension, it contributes to improvement in energy efficiency.

A model evaluation device, a filter generating device, a model evaluation method, a filter generating method and a storage medium according to the present invention employ the following configurations.

(1) A model evaluation device according to an aspect of the present invention includes an acquisition part configured to acquire updated second auxiliary filter information in which first auxiliary filter information and second auxiliary filter information are updated through learning, the first auxiliary filter information being generated by a first processing based on data for generation which was used in generation of a mathematical model which predicts degradation of an analysis target, the second auxiliary filter information indicating a regulation for estimating a reliability of a prediction result by the mathematical model while using the first auxiliary filter information; and an evaluation part configured to evaluate an accuracy of prediction by the mathematical model while using the second auxiliary filter information in a case input-scheduled data which is scheduled to be input to the mathematical model is actually input to the mathematical model.

(2) In the aspect of the above-mentioned (1), the data for generation is multi-dimensional time series data showing a change over time in each of a plurality types of variables that are expressing a state related to the degradation of the analysis target.

(3) In the aspect of the above-mentioned (2), the first processing is data conversion processing of converting the multi-dimensional time series data into 1-dimensional data.

(4) In the aspect of the above-mentioned (3), the data conversion processing includes: processing of acquiring an accumulated time tensor that is a tensor obtained from one or plurality of pieces of the multi-dimensional time series data, and that is a tensor that shows an accumulated time for each of the pieces of multi-dimensional time series data, the accumulated time being a time in which each of the pieces of multi-dimensional time series data was present for each of a set of (i) a predetermined classification for each of the variables and (ii) a predetermined plurality of accumulated target durations which have same starting points with each other; variable probability value conversion processing that converts each elements of the accumulated time tensor for every sets consisted by each of the pieces of multi-dimensional time series data, each of the durations and each of types of degradation-related variables such that a sum of accumulated times of each of the classifications becomes 1; processing of obtaining a first high rank level vector on the basis of a variable probability value tensor that is an accumulated time tensor after conversion by execution of the variable probability value conversion processing, the first high rank level vector being a 1-dimensional vector whose element is an element that satisfies a condition in which a value is $P^{th}$ value (P is a previously determined integer of 1 or more) when counted from a largest value among all elements of the variable probability value tensor and among elements having the same variable type and classification to which they belong; and processing of obtaining a second high rank level vector on the basis of the accumulated time tensor, the second high rank level vector being a 1-dimensional vector whose element is an element that satisfies a condition in which a value is $R^{th}$ value (R is a previously determined integer of 1 or more, and R may be the same as or different from P) when counted from a largest value among all elements of the accumulated time tensor and among the elements having the same variable type and classification to which they belong in a duration that satisfies a duration condition in which a duration is within a $Q^{th}$ duration (Q is a previously determined integer of 1 or more) from a longest duration among a duration showed by an accumulated time tensor, and the first auxiliary filter information includes the first high rank level vector and the second high rank level vector.

(5) In the aspect of the above-mentioned (4), in the learning, in addition to the data for generation, virtual data that is multi-dimensional time series data, which satisfies a first auxiliary virtual data condition, a second auxiliary virtual data condition and a third auxiliary virtual data condition, is also used, the first auxiliary virtual data condition being a condition in which a prescribed value which is a value for each classifications of the variables and in which an average value and a distribution width of values of the variables for each classifications are previously determined, the second auxiliary virtual data condition being a condition in which a value showing a magnitude of an interaction for each set of average values of the values of the variables with respect to the different types of variables is a previously determined value for each of the sets of the average values, and the third auxiliary virtual data condition being a condition in which an accumulated time of each classifications of the variables is a previously determined accumulated time for each of the variables and the classifications.

(6) In the aspect of any one of the above-mentioned (1) to (5), in the learning, the first auxiliary filter information and the second auxiliary filter information are updated such that reliability of an estimation result by the mathematical model with respect to data obtained by actual measurement improves a data inclusion rate that is a probability which is a predetermined reliability or more.

(7) In the aspect of any one of the above-mentioned (1) to (6), in the learning, the first auxiliary filter information and the second auxiliary filter information are updated such that a difference between the estimation result by the mathematical model and physical or chemical characteristics included in the degradation of the analysis target is reduced.

(8) In the aspect of any one of the above-mentioned (1) to (7), the data for generation is multi-dimensional time series data showing a change over time in each of a plurality types of variables that are expressing a state related to the degradation of the analysis target, the first processing is data conversion processing of converting the multi-dimensional time series data into 1-dimensional data, the data conversion processing includes processing of acquiring an accumulated time tensor that is a tensor obtained from one or plurality of pieces of the multi-dimensional time series data, and that is a tensor that shows an accumulated time for each of the pieces of multi-dimensional time series data, the accumulated time being a time in which each of the pieces of multi-dimensional time series data was present for each of a set of (i) a predetermined the classification for each of the variables and (ii) a predetermined plurality of accumulated target durations which have same starting points with each other, and variable probability value conversion processing that converts each elements of the accumulated time tensor for every sets consisted by each of the pieces of multi-dimensional time series data, each of the durations and each of types of degradation-related variables such that a sum of accumulated time of each of the classifications becomes 1, and in the learning, initial data removal processing is executed that removes a sample which belongs to a duration in which a beginning of a time series with respect to a variable probability value tensor is set as a start of the duration, the variable probability value tensor being a tensor obtained from the data for generation and being an accumulated time tensor after being converted by execution of the variable probability value conversion processing.

(9) A filter generating device according to another aspect of the present invention includes a learning part configured to update first auxiliary filter information and second auxiliary filter information through learning, the first auxiliary filter information being data generated by a processing according to a first regulation based on data for generation which is data used in generation of a mathematical model which predicts degradation of an analysis target, the second auxiliary filter information indicating a regulation for estimating a reliability of a prediction result by the mathematical model while using the first auxiliary filter information.

(10) A model evaluation method according to another aspect of the present invention is executed by a computer, the model evaluation method having: an acquisition step of acquiring updated second auxiliary filter information in which first auxiliary filter information and second auxiliary filter information are updated through learning, the first auxiliary filter information being generated by a first processing based on data for generation which was used in generation of a mathematical model which predicts degradation of an analysis target, the second auxiliary filter information indicating a regulation for estimating a reliability of a prediction result by the mathematical model while using the first auxiliary filter information; and an evaluation step of evaluating an accuracy prediction by of the mathematical model while using the second auxiliary filter information in a case input-scheduled data which is scheduled to be input to the mathematical model is actually input to the mathematical model.

(11) A filter generating method according to another aspect of the present invention is executed by a computer, the filter generating method having a learning step of updating first auxiliary filter information and second auxiliary filter information through learning, the first auxiliary filter information being data generated by a processing according to a first regulation based on data for generation which is data used in generation of a mathematical model which predicts degradation of an analysis target, the second auxiliary filter information indicating a regulation for estimating a reliability of a prediction result by the mathematical model while the first auxiliary filter information.

(12) A storage medium according to another aspect of the present invention is a non-transitory computer-readable storage medium on which a program is stored to cause a computer to execute: processing of acquiring updated second auxiliary filter information in which first auxiliary filter information and second auxiliary filter information are updated through learning, the first auxiliary filter information being generated by a first processing based on data for generation which was used in generation of a mathematical model which predicts degradation of an analysis target, the second auxiliary filter information indicating a regulation for estimating a reliability of a prediction result by the mathematical model while using the first auxiliary filter information; and processing of evaluating an accuracy of prediction by the mathematical model while using the second auxiliary filter information in a case input-scheduled data which is scheduled to be input to the mathematical model is actually input to the mathematical model.

(13) A non-transitory storage medium according to another aspect of the present invention is a computer-readable non-transient storage medium on which a program is stored to cause a computer to execute: processing of updating first auxiliary filter information and second auxiliary filter information through learning, the first auxiliary filter information being data generated by a processing according to a first regulation based on data for generation which is data used in generation of a mathematical model which predicts degradation of an analysis target, the second auxiliary filter information indicating a regulation for estimating a reliability of a prediction result by the mathematical model while using the first auxiliary filter information.

According to the aspects of the above-mentioned (1) to (13), it is possible to suppress a decrease in reliability of the mathematical model that predicts degradation of the analysis target.

DETAILED DESCRIPTION OF THE INVENTION

Embodiment

Figure 1:
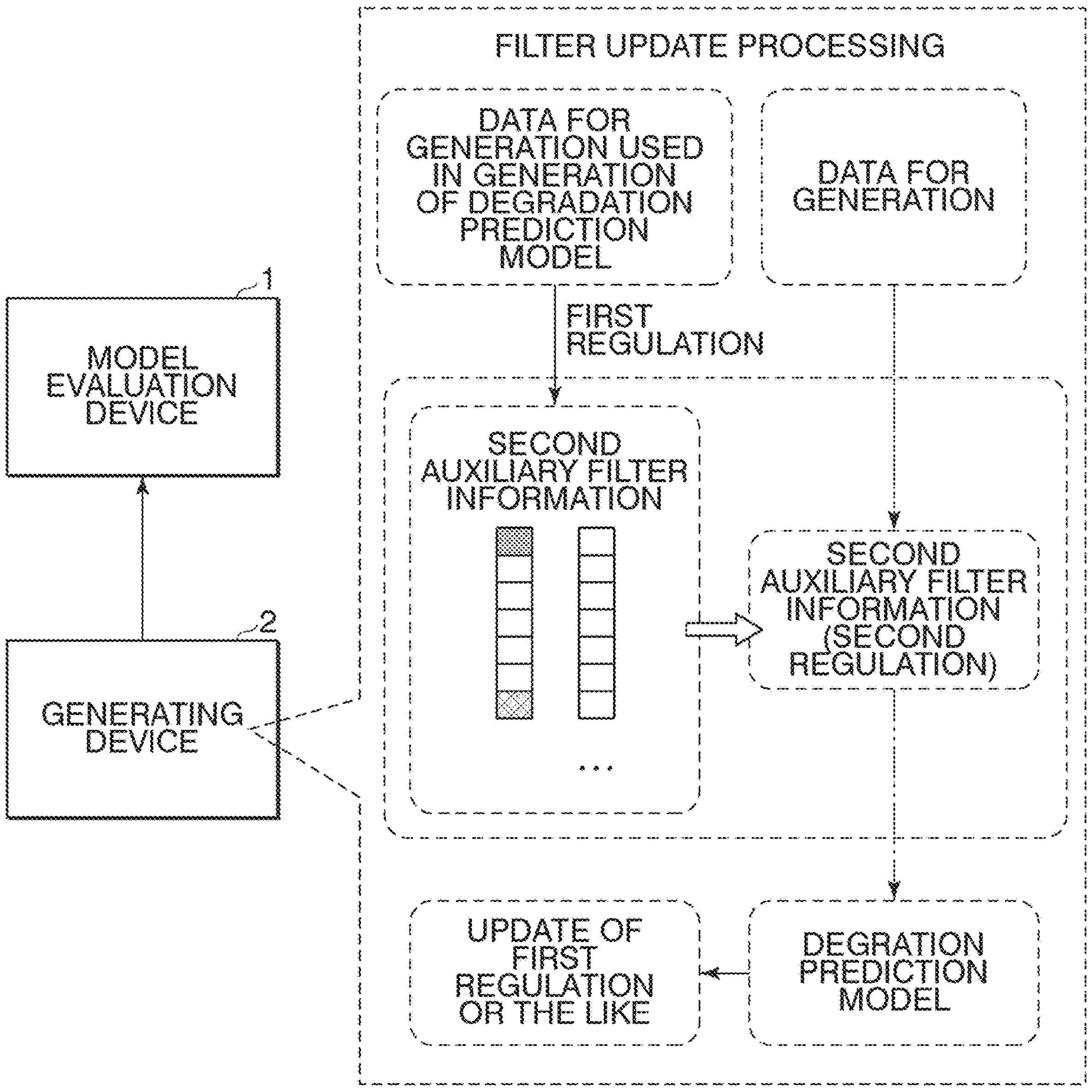
FIG. 1 is an explanatory diagram for describing a summary of a model evaluation system according to an embodiment.

FIG. 1 is an explanatory diagram for describing a summary of a model evaluation system 100 of an embodiment. The model evaluation system 100 includes a model evaluation device 1 and a generating device 2.

The model evaluation device 1 evaluates an accuracy of prediction of a mathematical model (hereinafter, referred to as "a degradation prediction model") that predicts degradation of an analysis target. While the degradation prediction model may be a mathematical model obtained by any method, for example, it may be a learned mathematical model obtained by machine learning.

More specifically, the model evaluation device 1 evaluates an accuracy of prediction of the degradation prediction model when data which will be input to the degradation prediction model (hereinafter, referred to as "input-scheduled data") is actually input to the degradation prediction model. Hereinafter, when the input-scheduled data is actually input to the degradation prediction model, processing of evaluating the accuracy of prediction of the degradation prediction model is referred to as prediction accuracy evaluation processing.

More specifically, the prediction accuracy evaluation processing is processing of determining for each of the input-scheduled data whether or not an input-scheduled data is a data that has a prediction accuracy in the degradation prediction model equal to or greater than a predetermined accuracy when such input-scheduled data is input to the degradation prediction model. Hereinafter, the processing of determining for each of the input-scheduled data whether or not the input-scheduled data is a data that has a prediction accuracy in the degradation prediction model equal to or greater than a predetermined accuracy when that input-scheduled data is input to the degradation prediction model is referred to as filter processing.

Hereinafter, the input-scheduled data in which accuracy of prediction of the degradation prediction model is equal to or greater than the predetermined accuracy when such input-scheduled data is input to the degradation prediction model is referred to as data within a guarantee range. Hereinafter, the input-scheduled data in which accuracy of prediction of the degradation prediction model is less than the predetermined accuracy when such input-scheduled data is input to the degradation prediction model is referred to as data outside the guarantee range. When the filter processing is defined using a term of the data within the guarantee range, the filter processing is processing of determining whether the input-scheduled data is the data within the guarantee range or not.

The filter processing is processing obtained by updating contents until a predetermined termination condition is satisfied so as to increase an accuracy of determination of whether the input-scheduled data is the data within the guarantee range based on the result of the prediction using the degradation prediction model. That is, the filter processing is processing obtained by executing the filter update processing until the predetermined termination condition (hereinafter, referred to as "learning termination condition") is satisfied. The filter update processing is processing of updating contents of the filter processing so as to increase an accuracy of determination of whether the input-scheduled data is the data within the guarantee range.

More specifically, the filter update processing is processing of updating first auxiliary filter information and second auxiliary filter information through learning. The first auxiliary filter information is data generated according to first regulation based on the data for generation. The data for generation is data used for generation of the degradation prediction model. The second auxiliary filter information is information showing second regulation. The second regulation is a regulation of estimation of reliability of the prediction result by the mathematical model and that is a regulation of estimation using the first auxiliary filter information. Details of the first regulation and the second auxiliary filter information (i.e., the second regulation) are updated by learning. The first auxiliary filter information is information updated according to the updating of the first regulation that is information according to the contents of the data for generation.

Describing the processing in terms of the second auxiliary filter, the filter processing is processing of performing the determination according to the second auxiliary filter information with respect to the input-scheduled data. The updating of the filter processing in the filter update processing is performed to increase an accuracy of the determination of whether the input-scheduled data is the data within the guarantee range.

The generating device 2 executes the filter update processing. The regulation of the updating of the contents of the filter processing in the filter update processing will be described more specifically. The updating of the contents of the filter processing is performed so as to increase an accuracy of the determination of whether the input-scheduled data is the data within the guarantee range on the basis of the result obtained by executing the degradation prediction model with respect to the data for generation obtained using the first auxiliary filter information and the second auxiliary filter information. Hereinafter, specific examples of data for generation, first regulation, first auxiliary filter information and second auxiliary filter information will be described.

Specific Examples of First Regulation, First Auxiliary Filter Information, Second Auxiliary Filter Information and Data for Generation The data for generation is, for example, data showing a use history of an analysis target. The data showing the use history of the analysis target is, for example, multi-dimensional time series data showing a time change of each of a plurality types of degradation-related variables (hereinafter, referred to as "multi-dimensional time series data"). The degradation-related variables are variables expressing a state related to the degradation of the analysis target.

The analysis target is, for example, a battery such as a battery or the like provided in a vehicle. The battery provided in the vehicle is, for example, a lithium ion battery. When the analysis target is the battery, the multi-dimensional time series data is, for example, data showing a use history of the battery. When the analysis target is the battery, the degradation-related variable is, for example, a state of charge (SOC), a temperature, a charging current or a discharging current. Accordingly, when the analysis target is the battery, the plurality types of degradation-related variables shown by the multi-dimensional time series data are, for example, an SOC, a temperature, a charging current and a discharging current.

Further, a difference between the plurality of pieces of multi-dimensional time series data used for learning of the degradation prediction model is a difference in situation of acquisition when each multi-dimensional time series data was acquired. The difference in situation of the acquisition is, for example, a difference in user using the analysis target. Accordingly, when the analysis target is the battery provided in the vehicle, the difference in situation of the acquisition is a difference in user of the vehicle. That is, the difference in multi-dimensional time series data is, for example, the difference in user of the vehicle.

For simplicity of the following description, an example when the analysis target is the battery will be exemplarily described. In addition, for simplicity of the following description, the case in which the multi-dimensional time series data shows a time change of a SOC, a temperature, a charging current and a discharging current will be exemplarily described. Further, for simplicity of the following description, the case in which the difference in multi-dimensional time series data is the difference in user of the vehicle will be exemplarily described.

Figure 2:
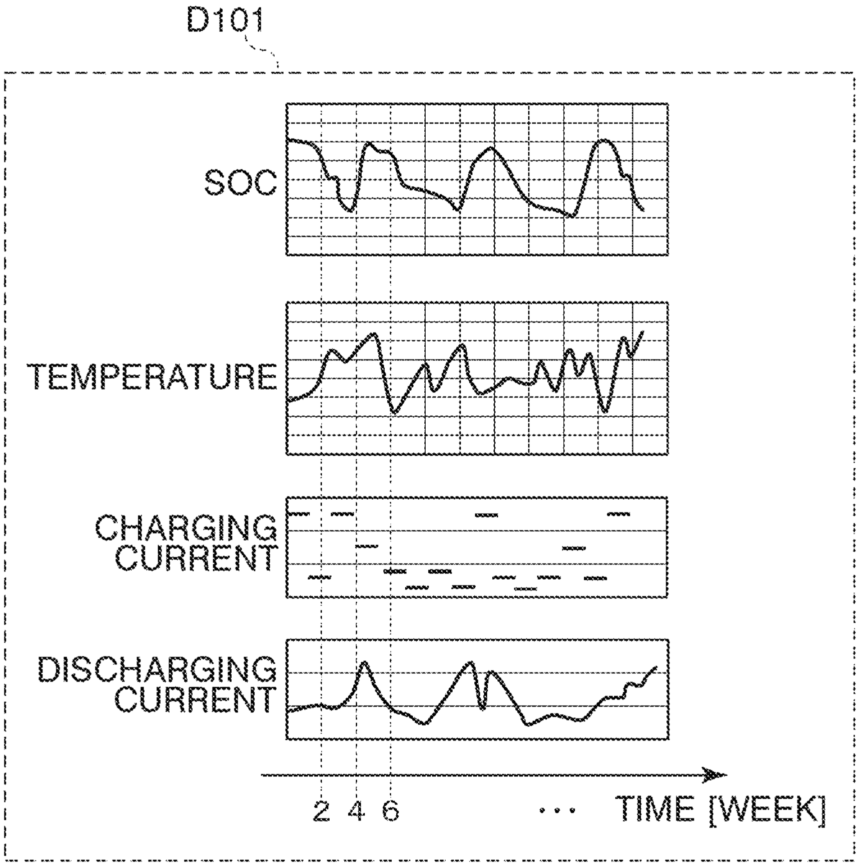
FIG. 2 is a view showing an example of data showing a use history of a battery according to the embodiment.

FIG. 2 is a view showing an example of data showing a use history of the battery according to the embodiment. Data D101 showing a use history of a battery in an example of FIG. 2 is data showing time series changes of an SOC, a temperature, a charging current and a discharging current. A lateral axis of the data D101 is a week that is a unit expressing time.

As described above, while the degradation prediction model is obtained by, for example, machine learning, an accuracy of prediction for data outside the range of the learning data may be degraded in the machine learning. In addition, even when it is not based on the machine learning, in general, while the mathematical model has a high estimation accuracy for data that has a small difference from the data used to generate the model, an estimation accuracy for data with a large difference from the data used to generate the model is low. Further, in this specification, the term "generation of the mathematical model" also includes update of the mathematical model.

This means that the information of the range of the data for generation exerts an influence to the evaluation of the reliability with respect to the prediction of the mathematical model. In fact, the information that defines the range of the data for generation is the second auxiliary filter information, and the evaluation of the reliability with respect to the prediction of the mathematical model is more appropriate as the information of the range of the data for generation becomes more appropriate.

However, when the data for generation is multi-dimensional data such as multi-dimensional time series data, since the multi-dimensional analysis is difficult in general, it is difficult to determine a range of generation proof data. For this reason, if there is a technology to convert from multi-dimensional data to 1-dimensional data while suppressing loss of information, it is possible to appropriately evaluate reliability of prediction of the mathematical model.

In the model evaluation device 1, the second auxiliary filter information obtained using the technology of converting from the multi-dimensional data to the 1-dimensional data while suppressing loss of the information is used for evaluation of reliability of the degradation prediction model. That is, when the second auxiliary filter information is acquired, for example, a technology of converting the multi-dimensional data to the 1-dimensional data as shown in FIG. 2 is used.

Here, after describing the meaning of the range of the data for generation just in case, an example of the technology of converting the multi-dimensional data to the 1-dimensional data while suppressing loss of the information will be described. For simplicity of the description, hereinafter, the processing of converting the multi-dimensional time series data into the 1-dimensional data is referred to as data conversion processing. The data conversion processing is an example of the processing according to the first regulation.

<With Respect to Meaning of Range of Data for Generation>

Just in case, definition of the range of the data for generation will be described. Mathematically, the mathematical model is a mapping in which input data is explanatory variables and output data is objective variables. Then, the mathematical model can output something with respect to data within the domain of the explanatory variables. The value of the output objective variables is the result of the prediction of the mathematical model.

However, the accuracy of the prediction is higher for data existing in a set with higher density of data used in generating the mathematical model, which is a set of data within the domain, and is lower for data existing in a set other than the set as mentioned above. Hereinafter, a set in which a density of the data used in generating the mathematical model is equal to or greater than a predetermined density, which is a set of data within the domain, is referred to as a high accuracy set. In addition, hereinafter, a set in which a density of data used in generating the mathematical model is less than the predetermined density, which is a set of data within the domain, is referred to as a low accuracy set. That is, the low accuracy set is a complementary set of the high accuracy set.

A range of the data for generation means the high accuracy set. Accordingly, the second auxiliary filter information is, in other words, a condition that defines the high accuracy set. For this reason, the filter update processing is also referred to as processing of updating a condition that defines the high accuracy set. Now, the data conversion processing will be described.

<Data Conversion Processing>

Figure 3:
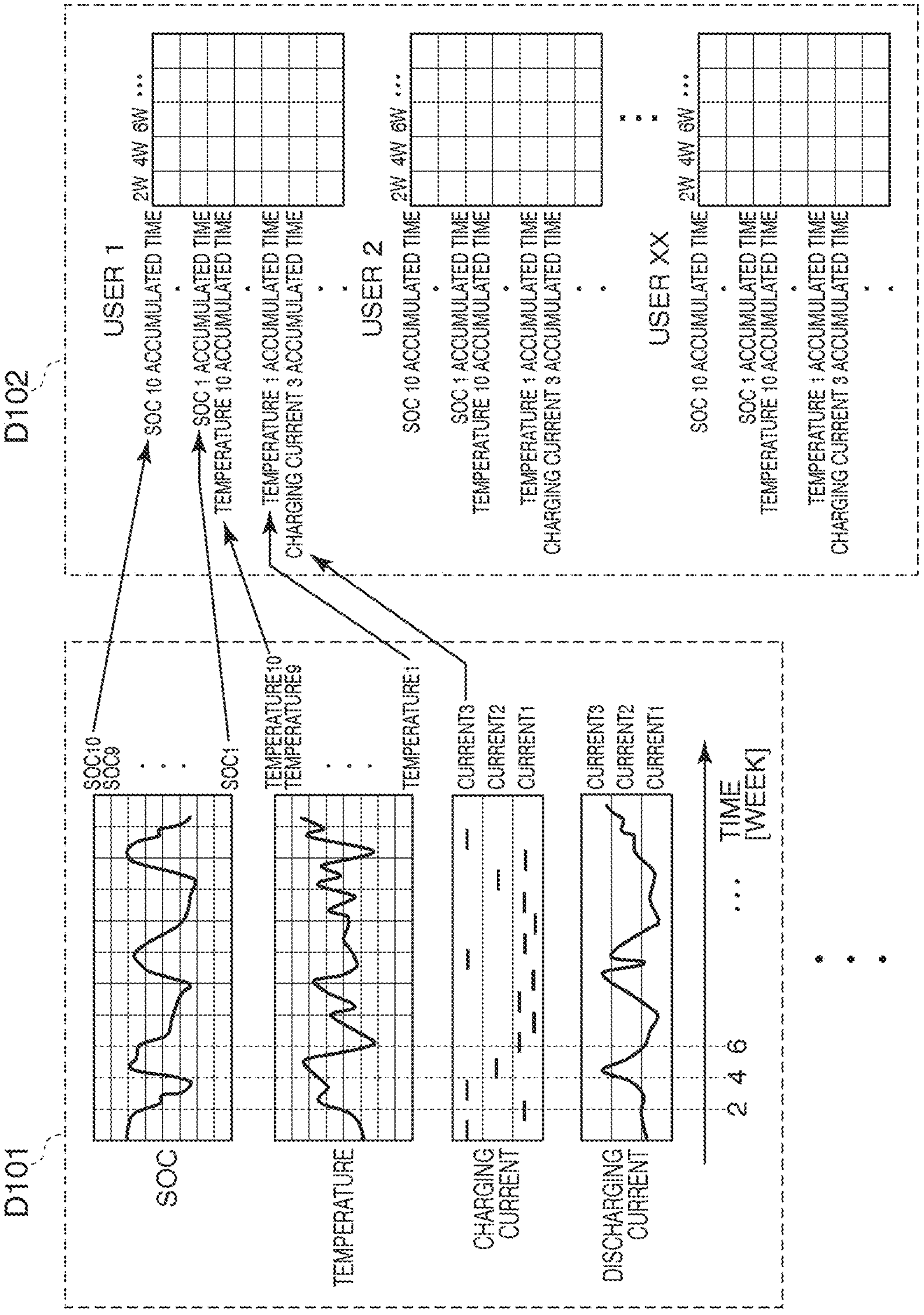
FIG. 3 is a first explanatory diagram for describing data conversion processing according to the embodiment.

FIG. 3 is a first explanatory diagram for describing the data conversion processing according to the embodiment. More specifically, FIG. 3 is an explanatory diagram for describing a specific example of processing executed in the data conversion processing. In the example of FIG. 3, during the data conversion processing, samples of each time series of an SOC, a temperature, a charging current and a discharging current are classified by each value of the SOC, the temperature, the charging current and the discharging current. In the example of FIG. 3, 10 ranges of SOC 1 to SOC 10 are defined with respect to the values of the SOC in advance, and in the data conversion processing, it is determined to which of SOC 1 to SOC 10 each sample in the time series SOC belongs.

In the example of FIG. 3, 10 ranges of a temperature 1 to a temperature 10 are defined with respect to temperature values in advance, and in the data conversion processing, each of the samples in the time series of temperature is determined to which such sample belongs among the temperature 1 to the temperature 10. In the example of FIG. 3, ranges of three of a current 1 to a current 3 are defined with respect to the value of the charging current in advance, and in the data conversion processing, each of the samples in the time series of charging current is determined to which such sample belongs among the current 1 to the current 3.

In the example of FIG. 3, ranges of three of the current 1 to the current 3 are defined with respect to the value of the discharging current in advance, and in the data conversion processing, each of the samples in the time series of discharging current is determined to which such sample belongs among the current 1 to the current 3.

In the data conversion processing, in this way, it is determined to which of predetermined classifications for each of the degradation-related variables each sample in the time series of the plurality types of degradation-related variables shown by the multi-dimensional time series data belongs. Hereinafter, the processing of determining which predetermined classifications for each of the degradation-related variables applies with respect to each of the samples in each of the time series included in the multi-dimensional time series data, is referred to as classification determination processing.

In the data conversion processing, accumulated time tensor generation processing is executed. The accumulated time tensor generation processing is processing of acquiring the accumulated time of each classification for the plurality of predetermined durations (hereinafter, referred to as "an accumulated target duration"), which equates the starts of the durations, on the basis of the determination result of the classification determination processing, with respect to each of the multi-dimensional time series data. Accordingly, the accumulated time tensor generation processing is processing of acquiring the accumulated time tensor.

Definition of the accumulated time tensor is shown. The accumulated time tensor is a tensor obtained from one or a plurality of pieces of multi-dimensional time series data. The accumulated time tensor is a tensor indicating the accumulated time for each of the pieces of multi-dimensional time series data, the accumulated time being a time in which each of the pieces of multi-dimensional time series data was present for each of a set of (i) a predetermined classification for each of the accumulated time degradation-related variables and (ii) a predetermined plurality of accumulated target durations which have same starting points with each other. As described above, since a difference between the plurality of pieces of multi-dimensional time series data is a difference in situation of acquisition in which when each of the multi-dimensional time series data is acquired, one or each of the plurality of pieces of multi-dimensional time series data has, for example, different users.

In the example of FIG. 3, the accumulated time tensor is data D102. The data D102 indicates the accumulated time for each of the SOC 1 to the SOC 10 in each duration from 2 weeks to (2×N) weeks (N is an integer of 1 or more) with respect to each of the users from a user 1 to a user xx. The start of each duration from 2 weeks to (2×N) weeks is the same.

Accordingly, when 2 weeks means 2 weeks with duration that is starting on, for example, Jan. 1, 2022, (2×N) weeks mean (2×N) weeks with duration that is starting on Jan. 1, 2022. The data D102 indicates the accumulated time for each of the temperature 1 to the temperature 10 in each of (2×N) durations with respect to each of users from the user 1 to the user xx. Each duration from 2 weeks to (2×N) weeks (N is an integer of 1 or more) in the example of FIG. 3 is an example of each accumulated target duration.

The data D102 indicates the accumulated time for each of the current 1 to the current 3 of the charging current in each accumulated target duration of 2 weeks to (2×N) weeks with respect to each user from the user 1 to the user xx. The data D102 indicates the accumulated time for each of the current 1 to the current 3 of the discharging current in each accumulated target duration of 2 week to (2×N) week with respect to each user from the user 1 to the user xx.

Accordingly, D102 is a tensor of (10+10+3+3)×N×xx.

Next, in the data conversion processing, the variable probability value conversion processing is executed with respect to the obtained accumulated time tensor. The variable probability value conversion processing is processing of converting each elements of the accumulated time tensor for every sets consisted by each of the pieces of multi-dimensional time series data, each of the durations and each of types of degradation-related variables such that a sum of the accumulated times of each of the classifications becomes 1. Hereinafter, the accumulated time tensor after being converted by execution of the variable probability value conversion processing is referred to as a variable probability value tensor. The variable probability value tensor is a time series whose amount on the time axis is accumulated time.

Figure 4:
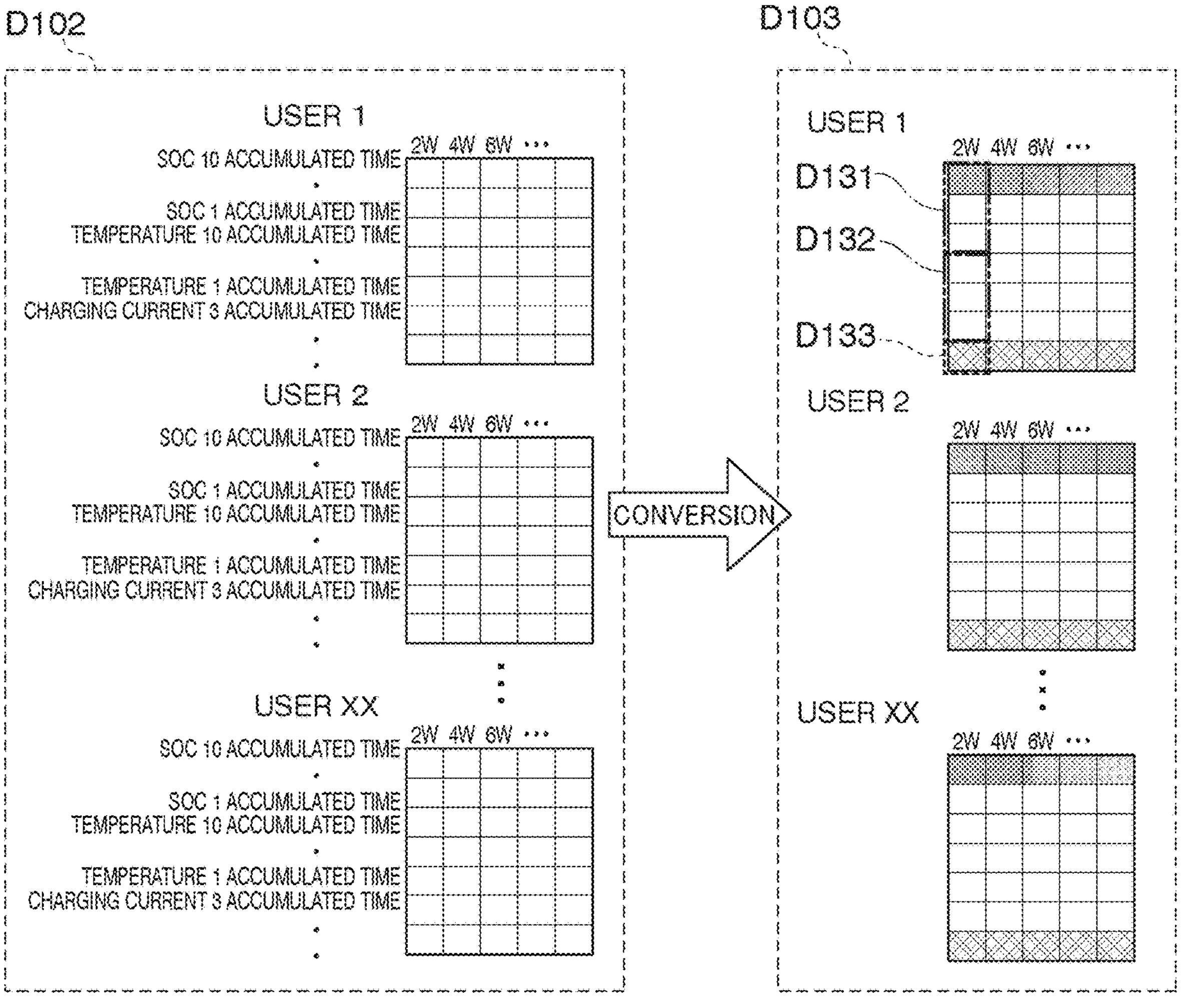
FIG. 4 is a second explanatory diagram for describing data conversion processing according to the embodiment.

FIG. 4 is a second explanatory diagram for describing data conversion processing according to the embodiment. More specifically, FIG. 4 is an explanatory diagram for describing variable probability value conversion processing according to the embodiment. Data D103 in the example of FIG. 4 is an example of the result obtained by executing the variable probability value conversion processing with respect to the data D102. That is, the data D103 is an example of the variable probability value tensor.

D131 is a set of elements belonging to the same multi-dimensional time series data, the same duration and the same type of degradation-related variables, among the elements of the variable probability value tensor. D132 is a set of elements belonging to the same multi-dimensional time series data, the same duration and the same type of degradation-related variables, among the elements of the variable probability value tensor. D133 is a set of elements belonging to the same multi-dimensional time series data, the same duration and the same type of degradation-related variables, among the elements of the variable probability value tensor.

Accordingly, as a result of the variable probability value conversion processing, a sum of values of the elements belonging to D131 is 1, a sum of values of the elements belonging to D132 is 1, and a sum of values of the elements belonging to D133 is 1.

Next, in the data conversion processing, first high rank level vector generation processing is executed. The first high rank level vector generation processing is processing of generating a first high rank level vector. The first high rank level vector is a 1-dimensional vector whose element is an element that satisfies the first higher condition, among all the elements of the variable probability value tensor. The first higher condition is a condition in which the value is $P^{th}$ (P is a previously determined integer of 1 or more) when counted from the larger value among the elements that have the same variable type and classification to which they belong. Accordingly, when P is 1, the first high rank level vector is a 1-dimensional vector whose element is a maximum value of each variable type and each classification, among all the elements of the variable probability value tensor. Further, the variable type means a type of degradation-related variables.

Further, the $P^{th}$ condition counted from the largest value among elements that have the same variable type and classification to which they belong is a condition in which it is the $P^{th}$ counted from the largest value among elements that have the same variable type and classification to which they belong, using the entire multi-dimensional time series data as a target. The condition does not mean that it is the $P^{th}$ condition counted from the largest value among elements that have the same variable type and classification to which they belong for each of the multi-dimensional time series data.

Further, the value belonging to the same variable type means that both values belong to the domain of the same degradation-related variables.

Figure 5:
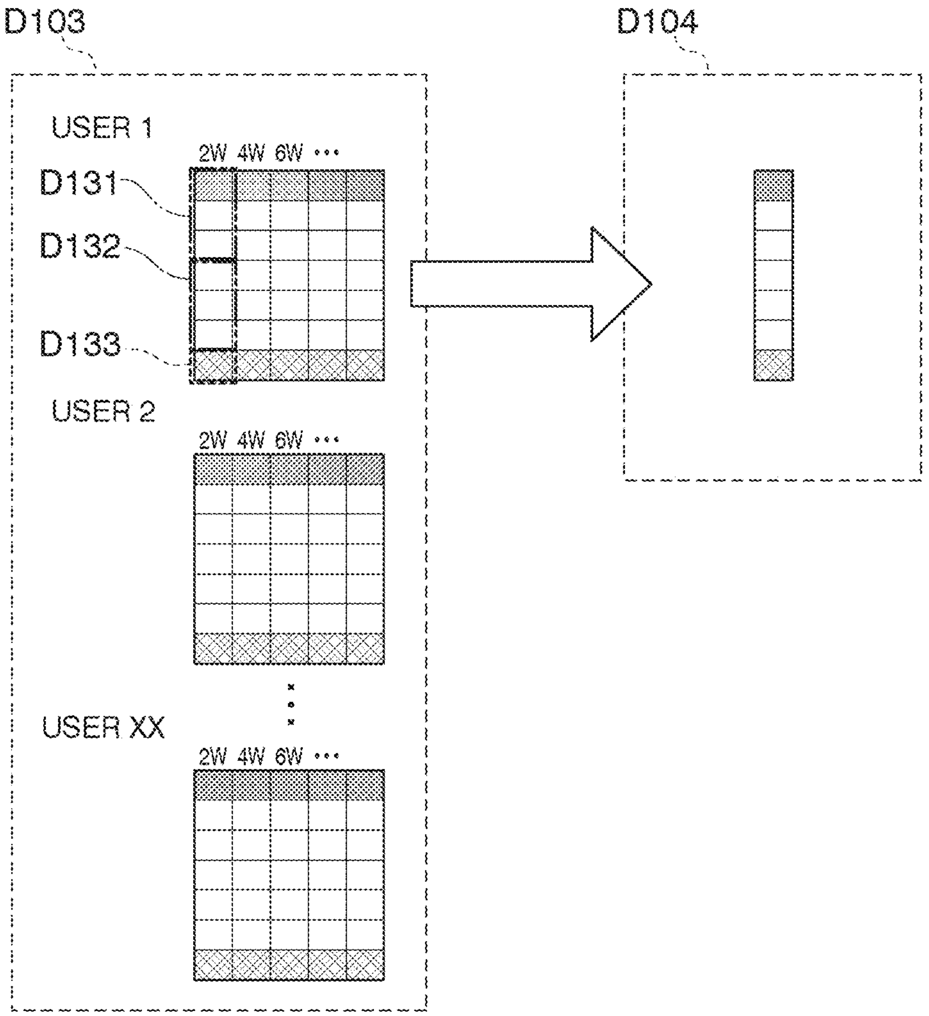
FIG. 5 is a third explanatory diagram for describing data conversion processing according to the embodiment.

FIG. 5 is a third explanatory diagram for describing data conversion processing according to the embodiment. More specifically, FIG. 5 is an explanatory diagram for describing first high rank level vector generation processing according to the embodiment. Data D104 in an example of FIG. 5 is an example of the result obtained by executing the first high rank level vector generation processing with respect to the data D103. That is, the data D104 is an example of the first high rank level vector. As shown in FIG. 5, the first high rank level vector is a 1-dimensional vector.

Figure 6:
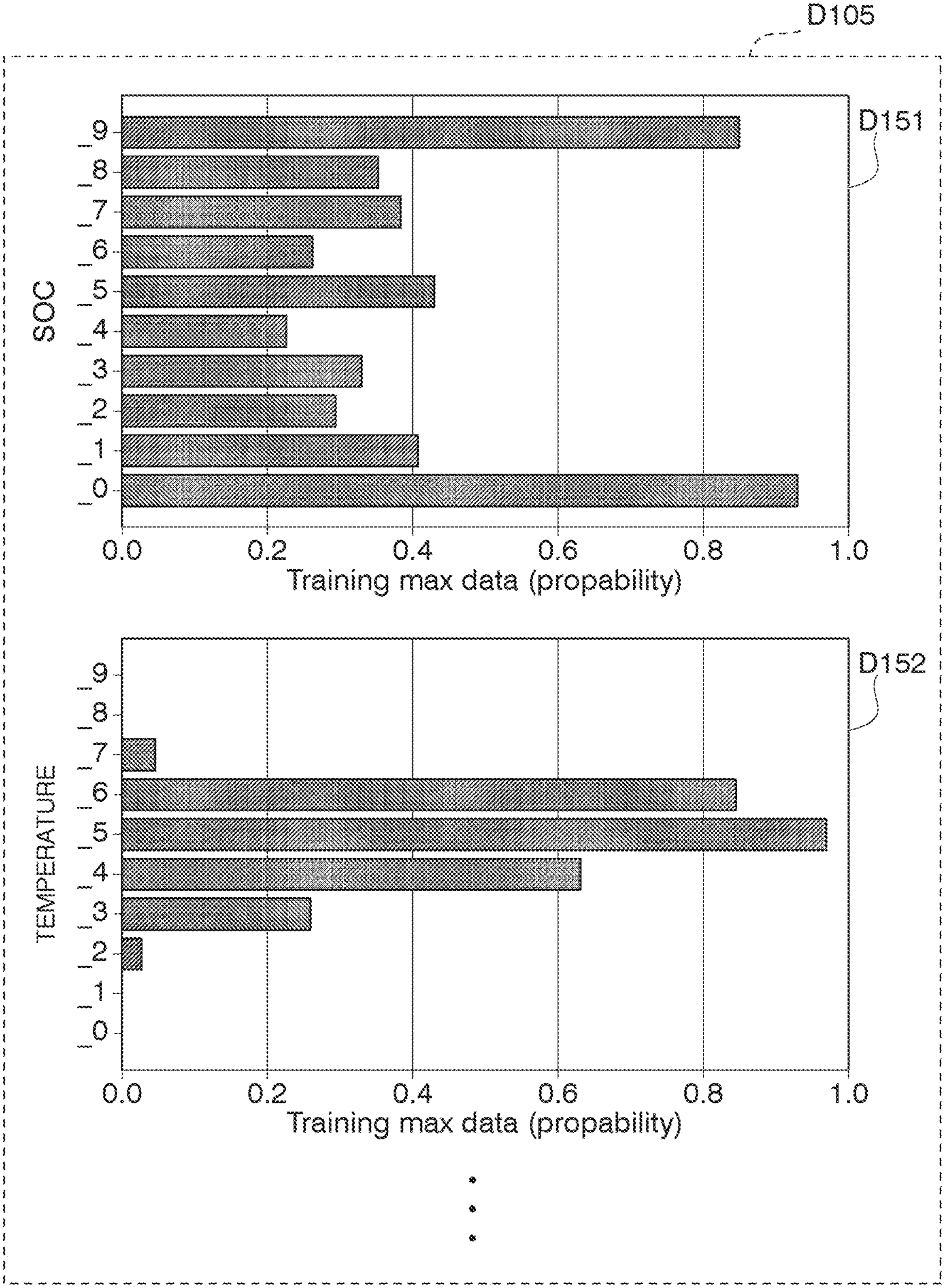
FIG. 6 is a fourth explanatory diagram for describing data conversion processing according to the embodiment.

FIG. 6 is a fourth explanatory diagram for describing data conversion processing according to the embodiment. More specifically, FIG. 6 is a view showing an example of the first high rank level vector according to the embodiment. More specifically, FIG. 6 is a view expressing values of elements of the first high rank level vector as a bar graph. In the example of FIG. 6, a value of each bar of data D151 in the bar graph of the SOC included in data D105 and a value of each bar of data D152 in the bar graph of the temperature are examples of the values of the elements of the first high rank level vector, respectively.

In this way, the multi-dimensional vector is converted into the 1-dimensional vector. Then, the first high rank level vector obtained in this way is an example of the information included in the first auxiliary filter information. In addition, each information processing described in FIG. 3 to FIG. 5 is an example of processing executed according to the regulation included in the first regulation. That is, the example of the regulation included in the first regulation is a regulation that determines contents of each information processing described in FIG. 3 to FIG. 5.

In the update of the first regulation, for example, a value P is updated. In the update of the first regulation, for example, definition of the accumulated target duration may be updated.

(With Respect to Information Provided in First High Rank Level Vector)

Here, information provided in the first high rank level vector will be described. The first high rank level vector is data obtained by the data conversion processing with respect to the multi-dimensional time series data. As described above, in the data conversion processing, first, the accumulated time tensor generation processing is executed. In the accumulated time tensor generation processing, as described above, since the accumulated time is obtained for each classification of the degradation-related variables of each variable type, there is no loss of the information except for degradation of time resolution.

Next, in the data conversion processing, the variable probability value conversion processing is executed. This corresponds to setting the value of the element belonging to the same variable type to a probability value. Since the probability is a degradation-related variable that shows a relationship with the whole, a value of one element is converted to the information including also information of other classification by the variable probability value conversion processing.

Next, in the data conversion processing, the first high rank level vector generation processing is executed, and the first high rank level vector is generated. Since the first high rank level vector has the probability value as an element, it is the 1-dimensional information including also the information of another classification belonging to the same variable type. Accordingly, the first high rank level vector is referred to as information including relative information between the classifications.

(With Respect to Second Conversion Processing)

As described so far, the processing of converting the one or plurality of pieces of multi-dimensional time series data into the first high rank level vector is one of the processing included in the data conversion processing. Hereinafter, the processing of converting the one or plurality of pieces of multi-dimensional time series data into the first high rank level vector is referred to as first conversion processing. The first conversion processing is an example of processing executed according to the regulation included in the first regulation.

The data conversion processing includes not only the first conversion processing but also the other processing of converting the one or plurality of pieces of multi-dimensional time series data into the 1-dimensional data. Hereinafter, the other processing of converting the one or plurality of pieces of multi-dimensional time series data into the 1-dimensional data is defined as second conversion processing, and the second conversion processing will be described.

The second conversion processing executes processing of acquiring the accumulated time tensor (hereinafter, referred to as "accumulated time tensor acquisition processing"). The accumulated time tensor acquisition processing may be any processing of acquiring the accumulated time tensor. Accordingly, in the accumulated time tensor acquisition processing, when the accumulated time tensor is already generated, the processing of acquiring the generated accumulated time tensor is executed. When the accumulated time tensor is not generated, in the accumulated time tensor acquisition processing, classification determination processing and accumulated time tensor generation processing are executed, and processing of generating the accumulated time tensor is executed.

Next, in the second conversion processing, processing of generating a second high rank level vector on the basis of the accumulated time tensor (hereinafter, referred to as "second high rank level vector generation processing") is executed. The second high rank level vector is a 1-dimensional vector whose element is the element that satisfies the second higher condition in the duration that satisfies the duration condition, among all the elements of the accumulated time tensor. The duration condition is a condition in which a duration is within the $Q^{th}$ (Q is a previously determined integer of 1 or more) from the longest duration indicated by the accumulated time tensor is. Accordingly, for example, when Q is 1, the duration that satisfies the duration condition is the longest duration.

The second higher condition is an $R^{th}$ condition counted from the largest value (R is a previously determined integer of 1 or more. R is the same as or different from P), among the elements that have the same variable type and classification to which they belong. Accordingly, for example, when R is 1, the second high rank level vector is a 1-dimensional vector whose element is the element in the duration that satisfies the duration condition and whose element is the maximum value of each variable type and each classification, among all the elements of the accumulated time tensor.

Further, the $R^{th}$ condition counted from the largest value in the element that has the same variable type and classification to which they belong is a condition in which it is an $R^{th}$ counted from the largest value of the element that has the same variable type and classification to which they belong, using all the multi-dimensional time series data as a target. The condition does not mean that it is the $R^{th}$ condition counted from the largest value among the elements that have the same variable type and classification to which they belong for each of the multi-dimensional time series data.

Figure 7:
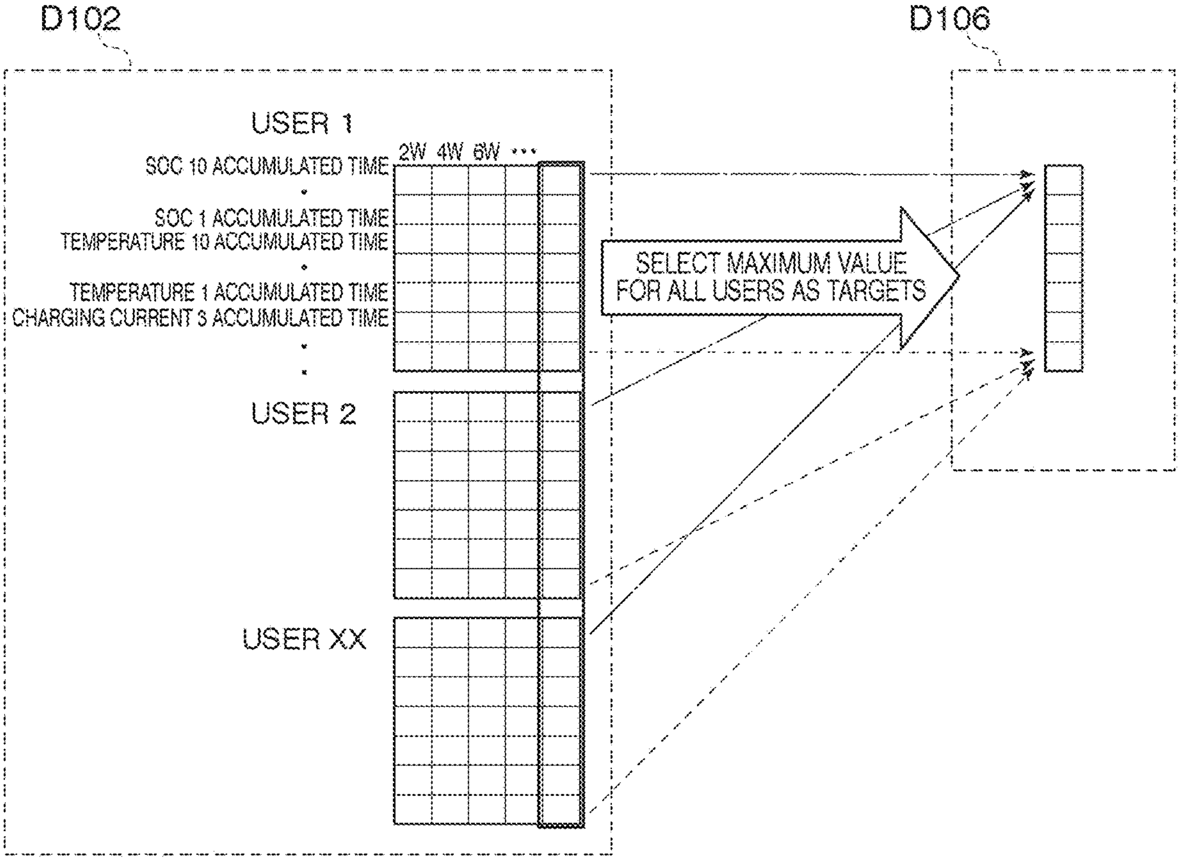
FIG. 7 is a fifth explanatory diagram for describing data conversion processing according to the embodiment.

FIG. 7 is a fifth explanatory diagram for describing data conversion processing according to the embodiment. More specifically, FIG. 7 is an explanatory diagram for describing an example of second high rank level vector generation processing. More specifically, FIG. 7 is an explanatory diagram for describing processing after acquisition of the accumulated time tensor by the accumulated time tensor acquisition processing in the second high rank level vector generation processing, which is an example of the processing of acquiring the second high rank level vector on the basis of the accumulated time tensor. In addition, FIG. 7 is an explanatory diagram for describing an example of the second high rank level vector generation processing when either Q or R is 1.

The data D102 in FIG. 7 is the same accumulated time tensor as in FIG. 4. Data D106 in FIG. 7 is an example of the second high rank level vector. The data D106 is an example of the result obtained by executing the second high rank level vector generation processing with respect to the data D103. FIG. 7 shows that the second high rank level vector is a vector whose element is the maximum value of each variable type and each classification in the longest accumulated target duration shown by each accumulated time tensor.

Figure 8:
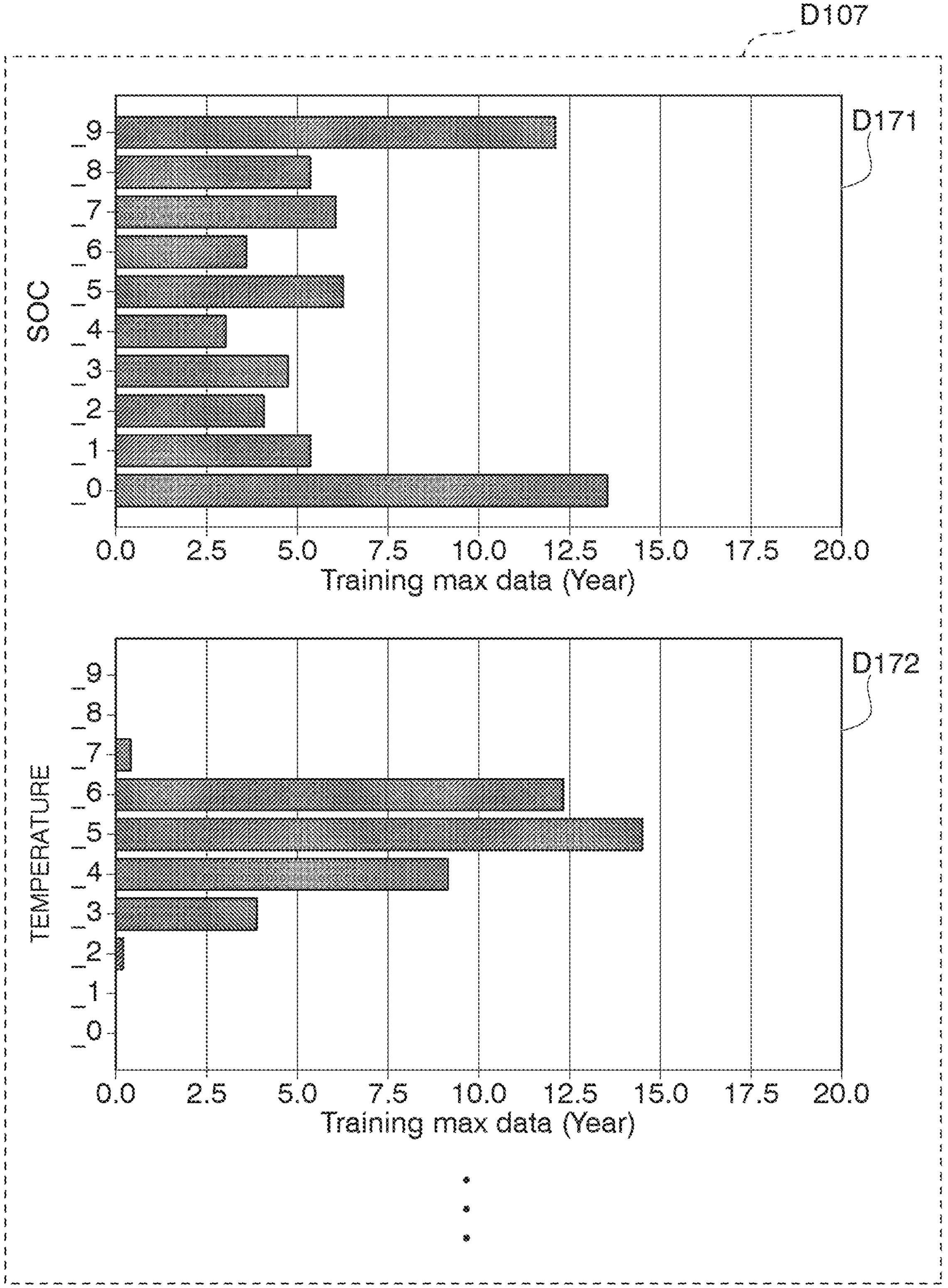
FIG. 8 is a sixth explanatory diagram for describing data conversion processing according to the embodiment.

FIG. 8 is a sixth explanatory diagram for describing data conversion processing according to the embodiment. More specifically, FIG. 8 is a view showing an example of the second high rank level vector according to the embodiment. More specifically, FIG. 8 is a view showing values of the elements of the second high rank level vector as a bar graph. In the example of FIG. 8, a value of each bar of data D171 in the bar graph of the SOC included in the data D107 and a value of each bar of data D172 in the bar graph of the temperature are examples of values of the elements of the second high rank level vector.

In this way, the multi-dimensional vector is converted into the 1-dimensional vector. Then, the second high rank level vector obtained in this way is an example of the information included in the first auxiliary filter information. In addition, information processing described in FIG. 7 (i.e., second high rank level vector generation processing) is an example of processing executed according to the regulation included in the first regulation. That is, the example of the regulation included in the first regulation is a regulation that determines contents of the second high rank level vector generation processing. Accordingly, the second conversion processing is also an example of the processing executed according to the regulation included in the first regulation.

In the update of the first regulation, for example, a value Q or R is updated.

(With Respect to Information Provided in Second High Rank Level Vector)

Here, information provided in the second high rank level vector will be described. From the description so far, it can be said that the second high rank level vector is information covering a range of each classification unit belonging to the same variable type. In addition, since the second high rank level vector is not a probability value unlike the first high rank level vector, it is not the 1-dimensional information including also information of other classification belong to the same variable type. That is, it has a strong non-relative degree of information compared to the first high rank level vector, and it has a strong absolute degree of information.

In this way, the information including the first high rank level vector and the second high rank level vector can be said in other words that the information which the set of the multi-dimensional data before the data conversion processing includes is information which included while being separated into absolute information and relative information. Accordingly, such data conversion processing is processing of converting the multi-dimensional data into the 1-dimensional data while suppressing degradation of the information in comparison with the case in which the multi-dimensional data is converted into the 1-dimensional data by, for example, convolution integral. This is because the first high rank level vector and the second high rank level vector are not separated in the convolution integral, and information about whether the relative information and the absolute information are included or information about how the relative information and the absolute information are included are lost.

With Respect to Example of Second Auxiliary Filter Information

Figure 9:
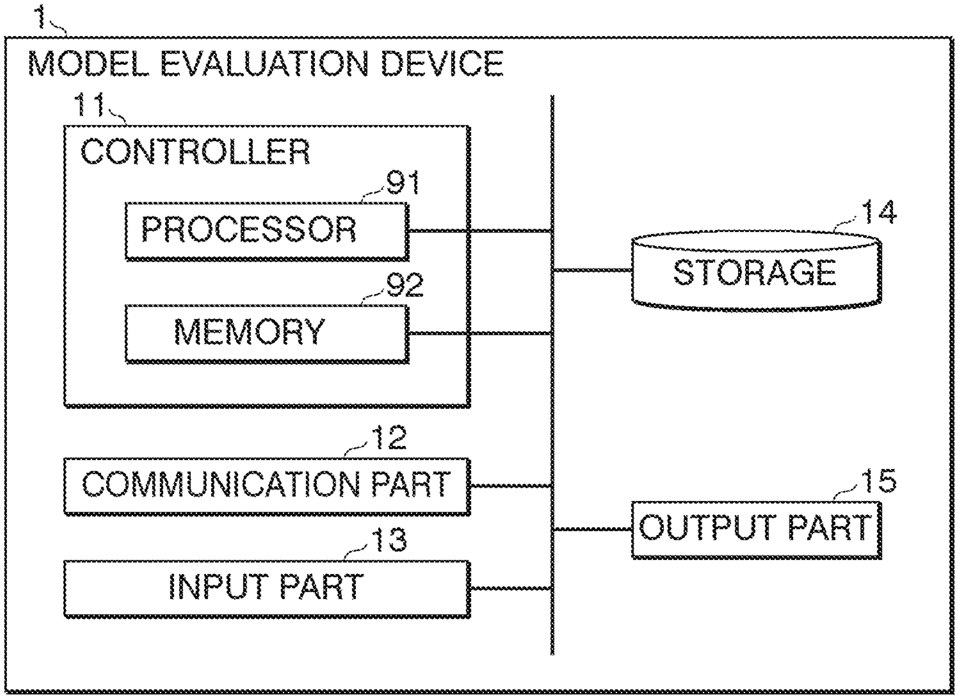
FIG. 9 is a view showing an example of a hardware configuration of a model evaluation device according to the embodiment.

An example of the second auxiliary filter information will be described. A range of values whose maximum value is a value indicated by the first high rank level vector and the second high rank level vector is an example of the range of the data for generation. As described above, the information that defines the range of the data for generation is the second auxiliary filter information. Accordingly, the information indicating that the value indicated by the first high rank level vector and the second high rank level vector is a range of the values as the maximum value is an example of the second auxiliary filter information. For this reason, for example, when the first high rank level vector and the second high rank level vector are updated. the contents of the second auxiliary filter information are information that a specific value showing the range of the data for generation is changed FIG. 9 is a view showing an example of a hardware configuration of the model evaluation device 1 according to the embodiment. The model evaluation device 1 includes a processor 91 such as a central processing unit (CPU) or the like, and a memory 92, which are connected by a bus, and executes a program. The model evaluation device 1 functions as a device including a controller 11, a communication part 12, an input part 13, a storage 14 and an output part 15, through execution of the program.

More specifically, the model evaluation device 1 reads the program stored in the storage 14 using the processor 91, and the read program is stored in the memory 92. When the processor 91 executes the program stored in the memory 92, the model evaluation device 1 functions as a device including the controller 11, the communication part 12, the input part 13, the storage 14 and the output part 15.

The controller 11 controls operations of various functional units provided in the model evaluation device 1. The controller 11 controls, for example, operations of the communication part 12, the input part 13, the storage 14 and the output part 15. The controller 11 executes, for example, prediction accuracy evaluation processing. The controller 11 executes, for example, filter processing. The controller 11 acquires, for example, second auxiliary filter information obtained by the generating device 2 via the communication part 12 or the input part 13.

The communication part 12 includes a communication interface configured to connect the model evaluation device 1 to an external device. The communication part 12 comes in communication with the external device in a wired or wireless manner. The external device is, for example, the generating device 2. The communication part 12 acquires second auxiliary filter information obtained by the generating device 2 through communication with the generating device 2. The external device is, for example, a device of a transmission source of input-scheduled data. The communication part 12 acquires input-scheduled data through communication with a device of a transmission source of input-scheduled data.

The input part 13 includes an input device such as a mouse, a keyboard, a touch panel, or the like. The input part 13 may be configured as an interface configured to connect these input devices to the model evaluation device 1. The input part 13 receives input of various types of information to the model evaluation device 1. For example, the second auxiliary filter information obtained by the generating device 2 is input to the input part 13. For example, input-scheduled data may be input to the input part 13. For example, an instruction of a user may be input to the input part 13.

The storage 14 is configured using a computer-readable storage medium device such as a magnetic hard disk device, a semiconductor storage device, or the like. The storage 14 stores various types of information related to the model evaluation device 1. For example, the storage 14 stores the information input via the communication part 12 or the input part 13. The storage 14 stores various types of information generated by executing the processing using, for example, the controller 11.

The output part 15 outputs various types of information. The output part 15 includes a display device such as a cathode ray tube (CRT) display, a liquid crystal display, an organic electro-luminescence (EL) display, or the like. The output part 15 may be configured as an interface configured to connect these display devices to the model evaluation device 1. The output part 15 outputs, for example, the information input to the communication part 12 or the input part 13. For example, the output part 15 may output various types of information obtained by executing the processing using the controller 11. The output part 15 may output, for example, the result of the prediction accuracy evaluation processing.

Figure 10:
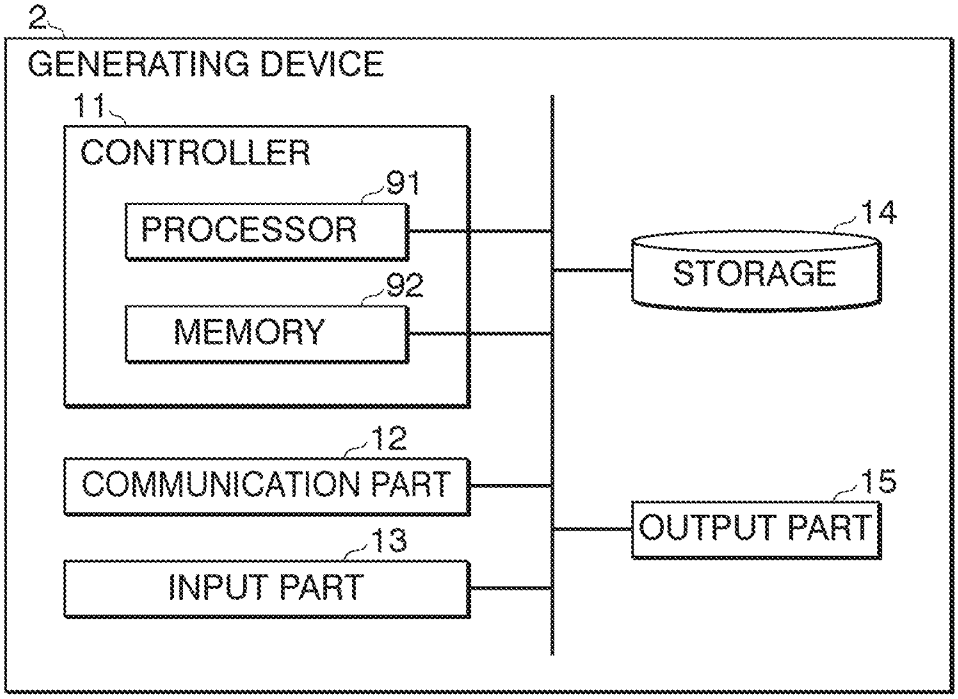
FIG. 10 is a view showing an example of a hardware configuration of a generating device according to the embodiment.

FIG. 10 is a view showing an example of a hardware configuration of the generating device 2 according to the embodiment. The generating device 2 includes a processor 93 such as a CPU or the like, and a memory 94, which are connected by a bus, and executes a program. The generating device 2 functions as a device including a controller 21, a communication part 22, an input part 23, a storage 24 and an output part 25, through execution of the program.

More specifically, the generating device 2 reads the program stored in the storage 24 using the processor 93, and stores the read program in the memory 94. When the processor 93 executes the program stored in the memory 94, the generating device 2 functions as a device including the controller 21, the communication part 22, the input part 23, the storage 24 and the output part 25.

The controller 21 controls operations of various types of functional units provided in the generating device 2. The controller 21 controls operations of, for example, the communication part 22, the input part 23, the storage 24 and the output part 25. The controller 21 executes, for example, filter update processing. The controller 21 acquires, for example, information obtained via the communication part 22 or the input part 23.

The communication part 22 is configured to include a communication interface configured to connect the generating device 2 to the external device. The communication part 22 comes in communication with the external device in a wired or wireless manner. The external device is, for example, the model evaluation device 1. The communication part 22 transmits the second auxiliary filter information obtained by the generating device 2 to the model evaluation device 1 through communication with the model evaluation device 1. The external device is, for example, a device of a transmission source of data for generation. The communication part 22 acquires the data for generation through communication with the device of the transmission source of the data for generation. The communication part 22 may be, for example, a device of a transmission source of a degradation prediction model. In this case, the communication part 22 acquires the degradation prediction model through communication with the device of the transmission source of the degradation prediction model. Acquisition of the degradation prediction model means, for example, acquisition of the program of the degradation prediction model.

The input part 23 is configured to include an input device such as a mouse, a keyboard, a touch panel, or the like. The input part 23 may be configured as an interface configured to connect these input devices to the generating device 2. The input part 23 receives input of various types of information with respect to the generating device 2. For example, data for generation is input to the input part 23. For example, an instruction of a user is input to the input part 23.

The storage 24 is configured using a computer-readable storage medium device such as a magnetic hard disk device, a semiconductor storage device, or the like. The storage 24 stores various types of information related to the generating device 2. The storage 24 stores, for example, information input via the communication part 22 or the input part 23. The storage 24 stores, for example, various types of information generated by executing the processing using the controller 21. The storage 24 may store a degradation prediction model.

The output part 25 outputs various types of information. The output part 25 is configured to include a display device such as a CRT display, a liquid crystal display, an organic EL display, or the like. The output part 25 may be configured as an interface configured to connect these display devices to the generating device 2. The output part 25 outputs, for example, the information input to the communication part 22 or the input part 23. The output part 25 may output, for example, various types of information acquired by executing the processing using the controller 21. The output part 25 may output, for example, the result of the filter update processing.

Figure 11:
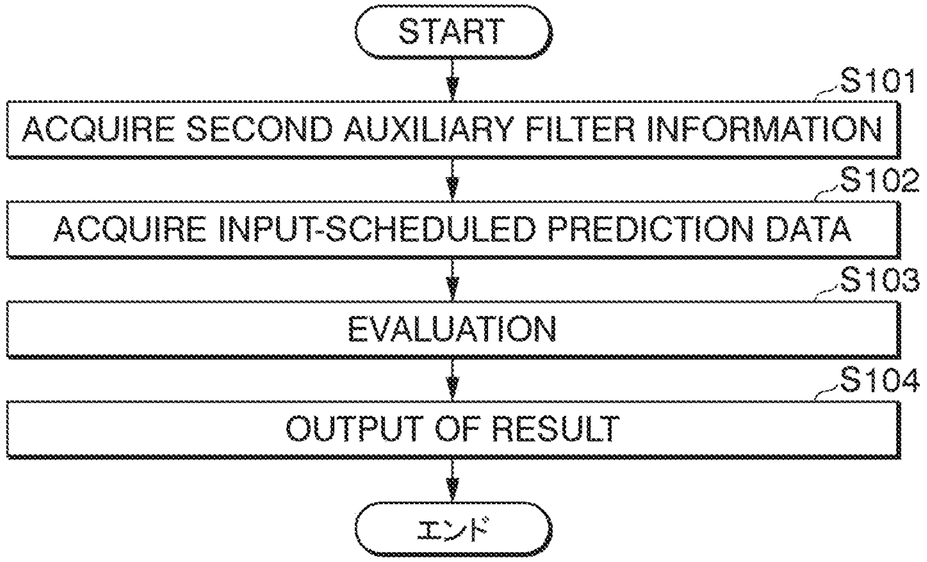
FIG. 11 is a flowchart showing an example of a flow of processing executed by the model evaluation device according to the embodiment.

FIG. 11 is a flowchart showing an example of a flow of processing executed by the model evaluation device 1 according to the embodiment. Second auxiliary filter information is input to the communication part 12 or the input part 13 (step S101). That is, the communication part 12 or the input part 13 acquires the second auxiliary filter information. Next, input-scheduled data is input to the communication part 12 or the input part 13 (step S102). That is, the communication part 12 or the input part 13 acquires the input-scheduled data.

Next, the controller 11 executes the filter processing (step S103). As described above, since the filter processing is an example of the prediction accuracy evaluation processing, in step S103, the prediction accuracy evaluation processing may be executed. Next, the controller 11 controls an operation of the output part 15, and outputs the result of step S103 to the output part 15 (step S104). Further, either the processing of step S101 or the processing of step S102 may be executed first, or may be executed in parallel.

Figure 12:
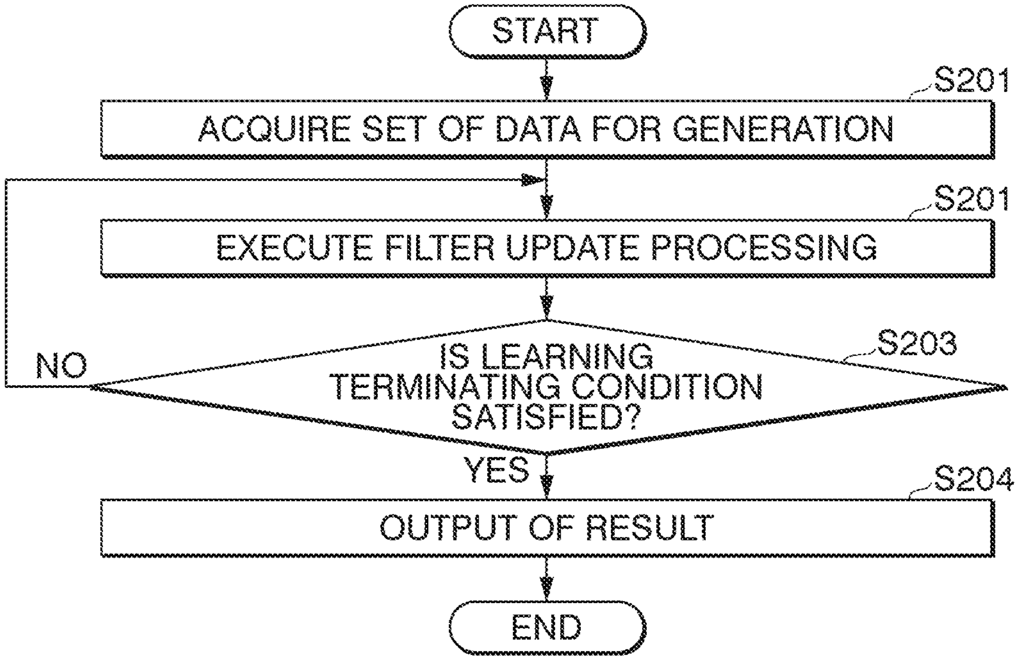
FIG. 12 is a flowchart showing an example of a flow of processing executed by the generating device according to the embodiment.

FIG. 12 is a flowchart showing an example of a flow of processing executed by the generating device 2 according to the embodiment. The data for generation is input to the communication part 22 or the input part 23 (step S201). That is, the communication part 22 or the input part 23 acquires the data for generation. Next, the controller 21 executes filter update processing (step S202). Next, the controller 21 determines whether the learning termination condition is satisfied (step S203).

When the learning termination condition is satisfied (step S203: YES), the controller 21 controls an operation of the output part 25, and outputs the result obtained by learning to the output part 25. Meanwhile, when the learning termination condition is not satisfied (step S203: NO), it returns to the processing of step S202.

The generating device 2 according to the embodiment configured in this way executes the filter update processing and updates the contents of the filter processing. As a result, the user can know in advance high and low accuracy of the estimation of the mathematical model that predicts degradation of the analysis target, and the user can use the mathematical model of the analysis target within a reliable range. Accordingly, the generating device 2 configured in this way can suppress a decrease in reliability of the mathematical model that predicts degradation of the analysis target.

The model evaluation device 1 according to the embodiment configured in this way performs evaluation of the degradation prediction model by executing the filter processing obtained by the generating device 2. Accordingly, the model evaluation device 1 configured in this way can suppress a decrease in reliability of the mathematical model that predicts degradation of the analysis target.

The model evaluation system 100 of the embodiment configured in this way includes the model evaluation device 1 or the generating device 2. Accordingly, the model evaluation device 1 configured in this way can suppress a decrease in reliability of the mathematical model that predicts degradation of the analysis target.

Variant

<With Respect to Generation of Virtual Data>

In the filter update processing, the contents of the filter processing may be updated on the basis not only the data for generation used upon generation of the degradation prediction model but also the multi-dimensional time series data (hereinafter, referred to as "virtual data") generated to satisfy the predetermined condition. In the filter update processing, processing similar to the data for generation is also performed on the virtual data. That is, the virtual data is data that inflates the data for generation.

The predetermined condition is, for example, a condition in which a set of virtual data is satisfied. An example of the condition in which the set of virtual data is satisfied (hereinafter, referred to as "a virtual data condition") will be described. The virtual data condition includes a condition in which a prescribed value which is a value for each classifications of the degradation-related variables and in which an average value and a distribution width of values of the degradation-related variables for each classification are previously determined (hereinafter, referred to as "a first auxiliary virtual data condition"). Hereinafter, the average value of the values of the degradation-related variables for each classification is referred to as a classification average value. In addition, hereinafter, the distribution width of the values of the degradation-related variables for each classification is referred to as a classification variance value.

Figure 13:
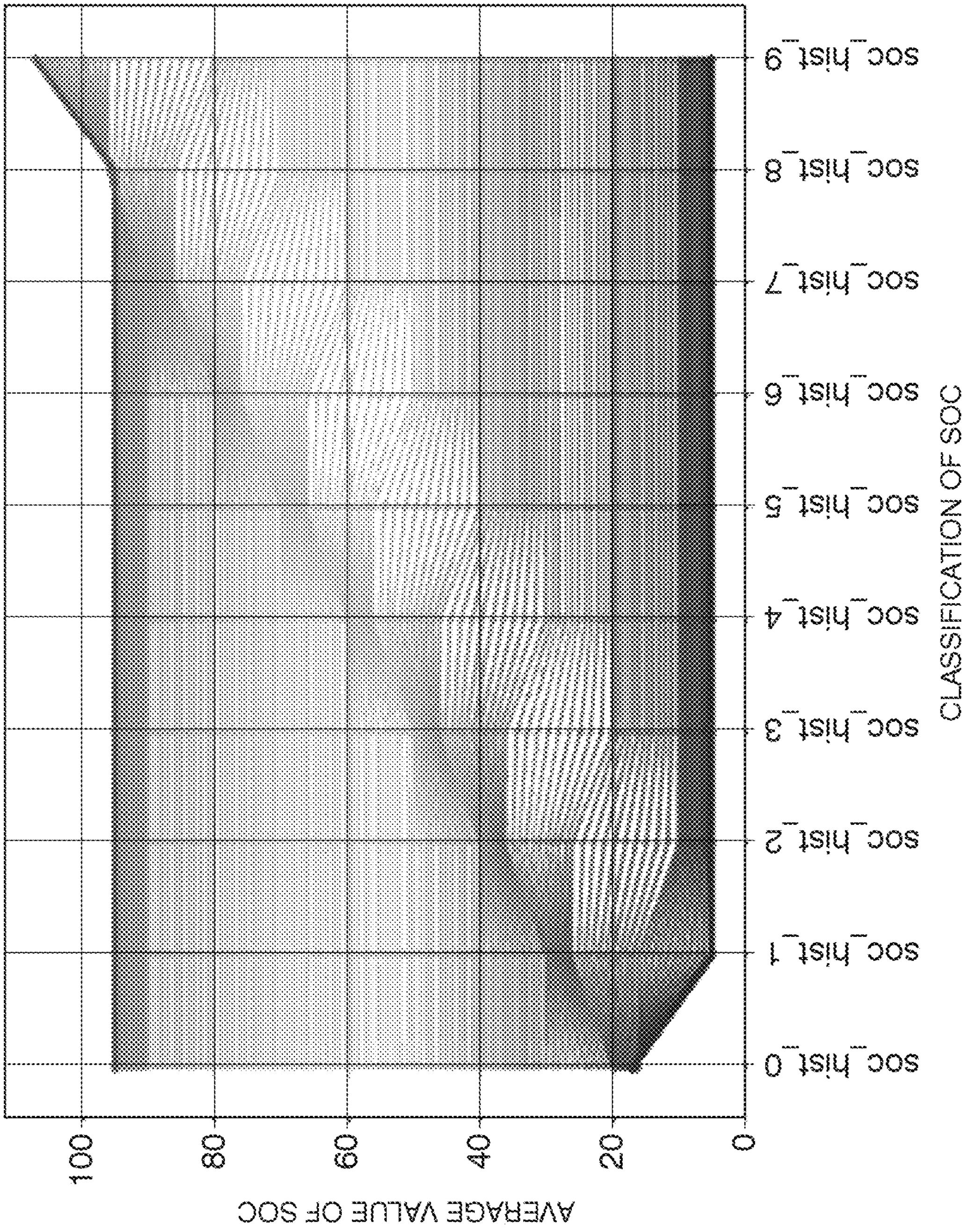
FIG. 13 is a view showing a plurality of examples of distribution of average values shown by a first auxiliary virtual data condition according to a variant.

FIG. 13 is a view showing a plurality of examples of the distribution of the average value shown by the first auxiliary virtual data condition according to the variant. FIG. 13 shows a plurality of examples of the distribution, a lateral axis of which shows classification of the SOC and a longitudinal axis of which shows an average value of values of the SOC. Each distribution of FIG. 13 is a Gauss distribution, and a difference in distribution is a difference in medium value. Further, since the distribution is information showing the average value and the distribution width of the values of the degradation-related variables in each classification, the set of the virtual data according to one of the plurality of distributions shown in FIG. 13 satisfies the first auxiliary virtual data condition.

The virtual data condition includes a condition in which a value showing a magnitude of an interaction for each set of average degradation-related variable values with respect to the different types of degradation-related variables is a previously determined value for each of the sets of average degradation-related variable values (hereinafter, referred to as "a second auxiliary virtual data condition"). The average degradation-related variable value is an average value of the values of the degradation-related variables. Accordingly, the average degradation-related variable value is a sum of products of the classification average value and the appearance frequency of each classification.

Figure 14:
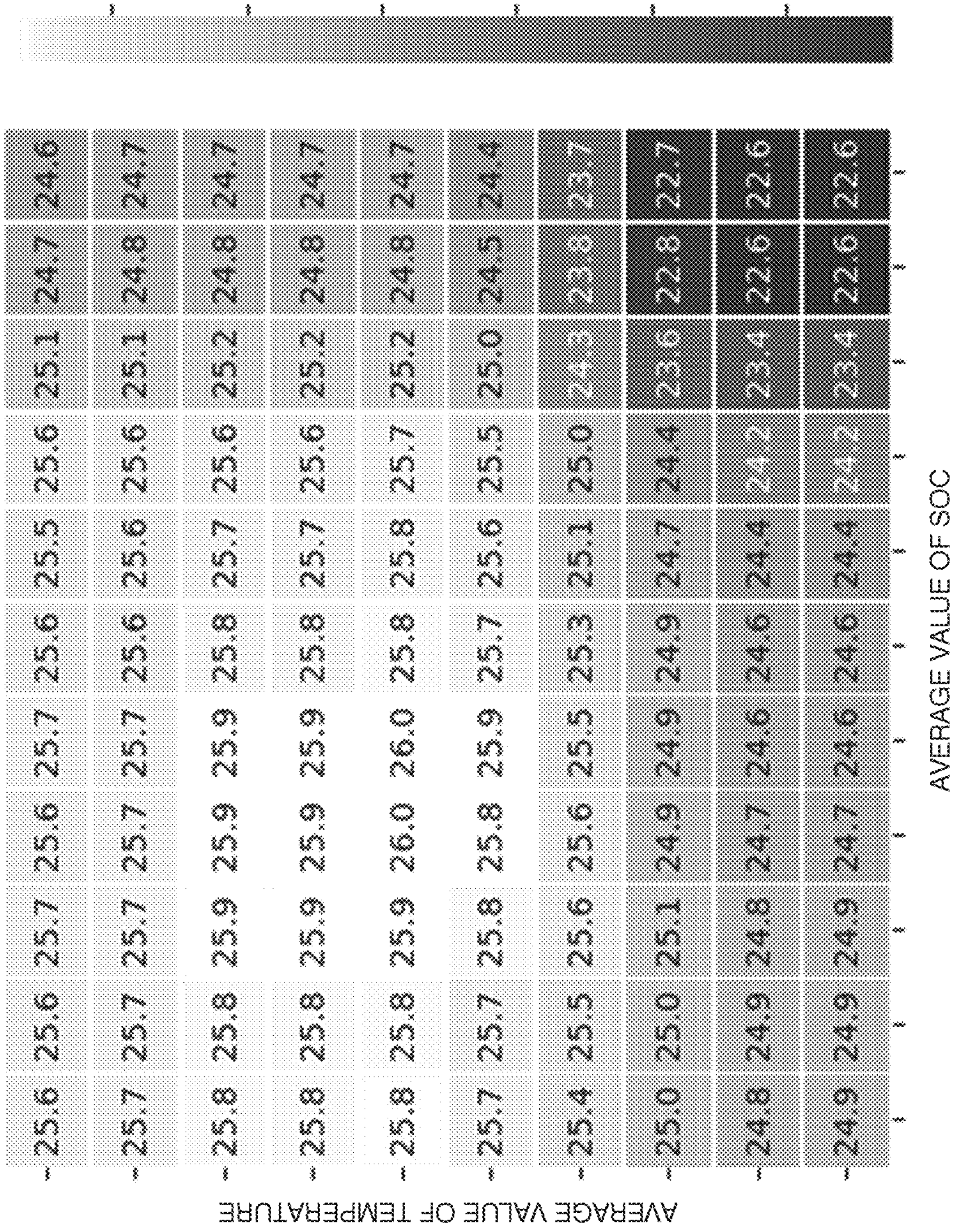
FIG. 14 is a view showing an example of a magnitude of an interaction shown by a second auxiliary virtual data condition according to the variant.

FIG. 14 is a view showing an example of a magnitude of an interaction indicated by the second auxiliary virtual data condition according to the variant. More specifically, FIG. 14 is a view showing an example of a magnitude of an interaction for each set of the average value of the SOC and the average value of the temperature.

The virtual data condition further includes a condition in which the accumulated time of each classifications of the degradation-related variables is an accumulated time of the previously determined accumulation target duration for each of the degradation-related variables and the classifications (hereinafter, referred to as "a third auxiliary virtual data condition"). The predetermined accumulated time is, for example, an accumulated time of an accumulated target duration that satisfies a condition in which a length of a duration is a maximum duration or more, which is desired to be predicted upon operation of the model evaluation device 1.

Figure 15:
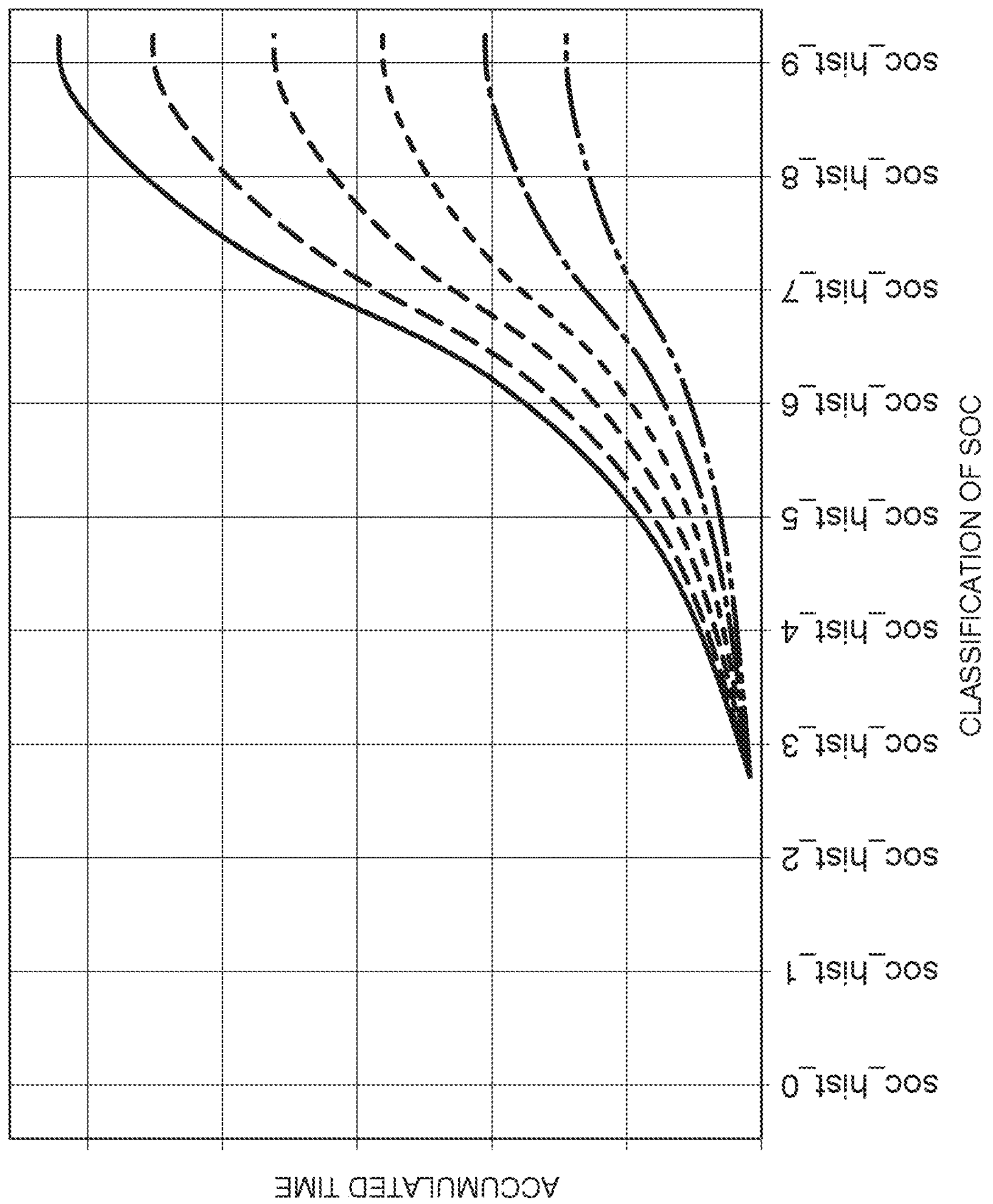
FIG. 15 is a view showing an example of an accumulated time shown by a third auxiliary virtual data condition according to the variant.

FIG. 15 is a view showing an example of an accumulated time shown by the third auxiliary virtual data condition according to the variant. More specifically, FIG. 15 is a view showing an accumulated time previously determined for each classification of the SOC.

If there is virtual data, even when the data for generation is not enough, it is possible to learn the contents of the filter processing. As a result, the model evaluation device 1 can suppress a decrease in reliability of the mathematical model that predicts further degradation of the analysis target.

Further, the virtual data may be added to the data for generation in time series. That is, the number of samples of the data for generation may be added by the virtual data. In this case, in the update of the contents of the filter processing, the data for generation with an increased number of samples may be used instead of the data for generation before the number of samples is increased.

With Respect to Example of Regulation of Update of Contents of Filter Processing and Data Inclusion Rate In the filter update processing, the contents of the filter processing may be updated to improve the data inclusion rate based on the data inclusion rate. The data inclusion rate is the probability that the reliability of the result of the estimation by the mathematical model for the data obtained by actual measurement is the predetermined reliability or more. The regulation that updates the contents of the filter processing to improve the data inclusion rate is an example of the update regulation that enhances the accuracy of the determination of whether the input-scheduled data is the data within the guarantee range.

The data inclusion rate is, for example, a user inclusion rate. The user inclusion rate is the probability that the reliability of the result of the prediction of the degradation prediction model when the information actually obtained by the user using the analysis target is used as an execution target of the degradation prediction model is the predetermined reliability or more.

The user inclusion rate used in the filter update processing is calculated on the basis of the plurality of obtained results by executing the degradation prediction model with respect to each information actually obtained by the plurality of users who use the analysis target. Calculation of the user inclusion rate is executed by, for example, the controller 21. Calculation of the user inclusion rate may be executed as the filter update processing, or the user inclusion rate may be obtained before execution of the filter update processing.

<Initial Data Removal Processing>

In the filter update processing, processing of removing samples which belongs to a duration (hereinafter, referred to as "an initial duration") in which the beginning of the time series with respect to the variable probability value tensor obtained from the data for generation is set as a start of the duration (hereinafter, may be referred to as "initial data removal processing") may be performed. The variable probability value tensor is a time series whose amount on the time axis is accumulated time as described above. Then, the variable probability value tensor is a time series showing probability values.

The probability value generally shows that the fluctuation is increased as the accumulated time is shortened, and the fluctuation is converged to be shortened as the accumulated time is increased. For this reason, it is difficult to obtain information in an intrinsic state of the system from the data in the duration with large fluctuations, and the data in the duration with large fluctuations may contribute as noise during analysis. Here, in the filter update processing, a situation in which the data acting as noise is not used for analysis is generated by using the data for which the initial data removal processing is executed.

The length of the initial duration is one of parameters updated by learning, and for example, values on the basis of the user inclusion rate or the like are updated. In the filter update processing, for example, contents of the filter processing are updated to improve the user inclusion rate. As a result of the filter update processing, the user inclusion rate may be 99% when the length of the initial duration at the time the learning termination condition is satisfied is, for example, 24 weeks.

With Respect to Update Based on Another Example and Behavior of Regulation of Update of Contents of Filter Processing In addition, in the filter update processing, the contents of the filter processing may be updated on the basis of the behavior. The update of the contents of the filter processing based on the behavior means specifically that the contents of the filter processing are updated on the basis of the difference between the prediction result of the degradation prediction model and the physical or chemical characteristics which the degradation of the analysis target has.

The regulation of the update based on the behavior is specifically regulation that the contents of the filter processing are updated such that the difference between the prediction result by the degradation prediction model and the physical or chemical characteristics which the degradation of the analysis target has is reduced. The regulation that the contents of the filter processing are updated such that the difference between the prediction result of the degradation prediction model and the physical or chemical characteristics which the degradation of the analysis target has is reduced is an example of the update regulation that increases accuracy of the determination of whether the input-scheduled data is the data within the guarantee range or not.

Here, an example in which the prediction result of the degradation prediction model is different from the physical or chemical characteristics which the degradation of the analysis target actually includes is described.

Figure 16:
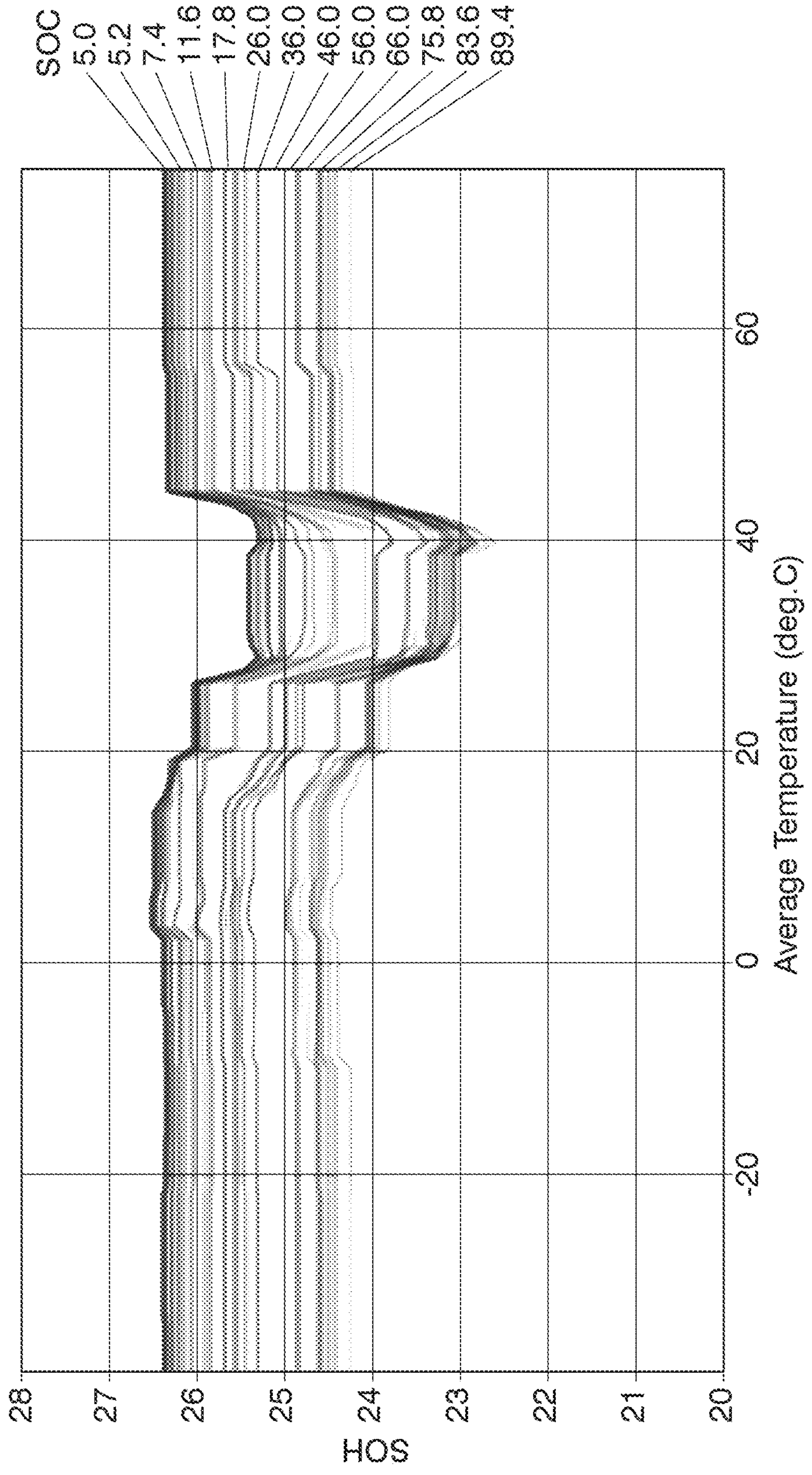
FIG. 16 is a view that shows a result of prediction of a degradation prediction model according to the variant and that shows an example of a result in which the result of prediction of the degradation prediction model is different from physical or chemical characteristics which the degradation of an analysis target actually includes.

FIG. 16 is view that shows a result of prediction of the degradation prediction model according to the variant and that shows an example of a result in which the result of prediction of the degradation prediction model is different from the physical or chemical characteristics which the degradation of the analysis target actually includes. In the example of FIG. 16, a lateral axis shows an average temperature of the battery, and a longitudinal axis shows an SOH of the battery. In the example of FIG. 16, it is shown that degradation recovers when the average temperature is set to 60 degrees Celsius. However, in practice, such a thing does not actually occur with the battery. That is, the prediction result of the degradation prediction model shown in FIG. 16 is different from the physical or chemical characteristics which the degradation of the analysis target actually includes.

When the update is performed on the basis of the difference between the prediction result of the degradation prediction model and the physical or chemical characteristics which the degradation of the analysis target actually includes, acquisition of the amount showing the difference between the prediction result of the degradation prediction model and the physical or chemical characteristics which the degradation of the analysis target actually includes is performed.

Here, an example of the processing of acquiring the amount showing the difference between the prediction result of the degradation prediction model and the physical or chemical characteristics which the degradation of the analysis target actually includes (hereinafter, referred to as "behavior amount acquisition processing") will be described. The execution target of the processing in the example described is a function, such as a graph or the like shown in FIG. 16, in which one of two amounts is an explanatory variable and the other is an objective variable. Such a function is, for example, a downward convex function with a minimum value of 1 or 0.

Figure 17:
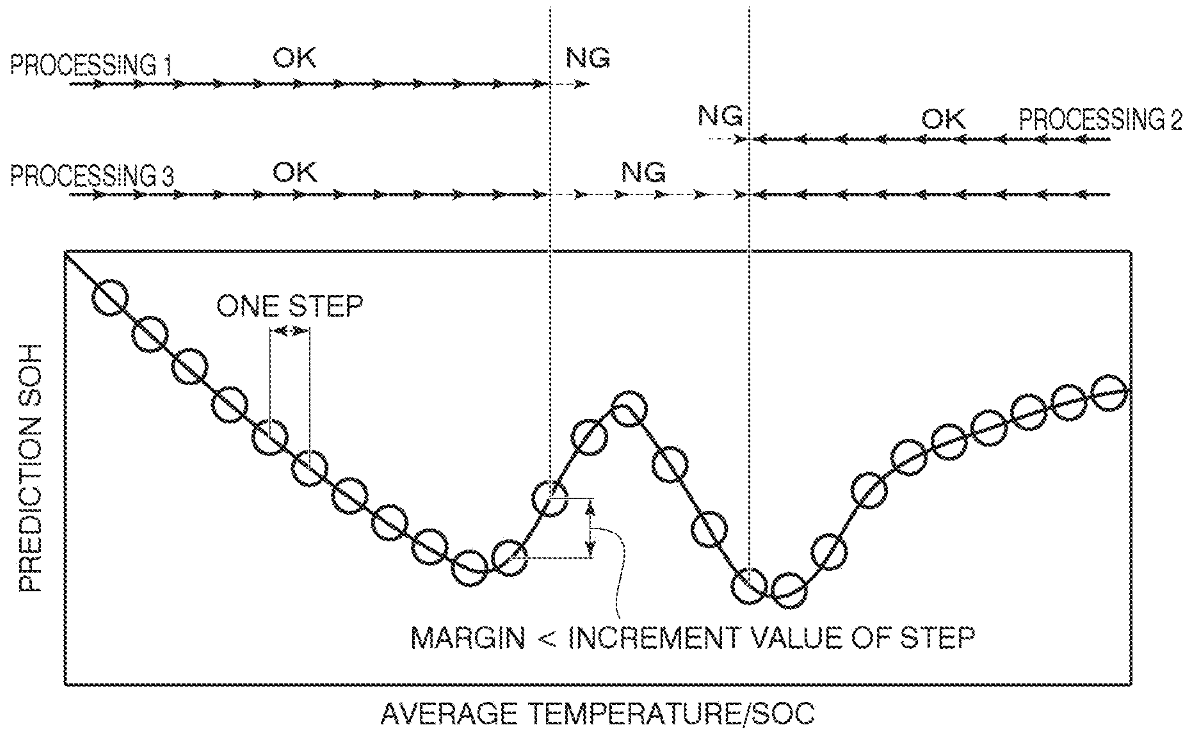
FIG. 17 is an explanatory diagram for describing an example of behavior amount acquisition processing according to the variant.

FIG. 17 is an explanatory diagram for describing an example of behavior amount acquisition processing according to the variant. For simplicity of the description, in the example of FIG. 17, an example of the behavior amount acquisition processing will be described using a case where the function is a set of discrete data. The function in the example of FIG. 17 is a downward convex function with a minimum value of 1. In the example of FIG. 17, a lateral axis indicates explanatory variables, and a longitudinal axis indicates objective variables. In the example of FIG. 17, an amount indicated by the explanatory variables is an amount obtained by dividing the average temperature by the SOH. In addition, in the example of FIG. 17, the amount indicated by the objective variables is the predicted SOH. The predicted SOH is the SOH predicted by the degradation prediction model.

In the behavior amount acquisition processing, processing is executed to move data on a left end of the lateral axis to the right one step at a time and determine a value of the lateral axis at the time the increase is greater than the designated margin as the left NG point. This processing is shown as Processing 1 in FIG. 17. Moving one step to the right means acquiring the values of the longitudinal axis and the lateral axis of the discrete data located closest to the right. The value of the designated margin is a value updated by learning.

Next, in the behavior amount acquisition processing, processing is executed to move the data on the right end of the lateral axis to the left one step at a time and determine the value of the lateral axis at the time an increase is the designated margin or more as a right NG point. This processing is shown as Processing 2 in FIG. 17. Moving one step to the left means acquiring the values of the longitudinal axis and the lateral axis of the discrete data located closest to the left.

Next, in the behavior amount acquisition processing, processing of removing data between the left NG point and the right NG point is executed. This processing is shown as Processing 3 in FIG. 17. Next, in the behavior amount acquisition processing, a ratio between a total data number after removal and the number of data before removal is acquired as an OK ratio. In FIG. 17, the number of data belonging to the region shown as OK is the total data number remained after removal. In FIG. 17, the data belonging to the region shown as NG is the removed data. Further, in FIG. 17, "NG: margin<increment value of 1 step" shows a determination reference that it is determined as NG when the margin is smaller than an increment value of 1 step. Such a reference is an example of a reference for determining no change for changes smaller than a predetermined change.

In the filter update processing, for example, the contents of the filter processing is updated to improve the OK ratio obtained in this way. As a result of the filter update processing, the OK ratio may be 100% when the length of the initial duration at the time the learning termination condition is satisfied is, for example, 3 weeks.

In the filter update processing, for example, learning may be performed to improve the data inclusion rate and reduce the difference between the prediction result of the degradation prediction model and the physical or chemical characteristics which the degradation of the analysis target actually includes. Accordingly, in the filter update processing, for example, learning may be performed to improve the data inclusion rate and the OK ratio.

Further, in the filter update processing, some of various types of data such as a graph or the like shown in FIG. 16 may be removed according to a predetermined threshold. While the above-mentioned initial data removal processing is an example of such processing, in addition to this, high rank level restriction processing or probability high rank level restriction processing may be executed.

The high rank level restriction processing is processing of removing a value larger than the maximum value of the second high rank level vector from the second high rank level vector. The probability high rank level restriction processing is processing of removing a value larger than the maximum value of the first high rank level vector from the first high rank level vector.

Further, the controller 21 provided in the generating device 2 may perform not only update of the contents of the filter processing in the filter update processing but also update of the degradation prediction model using only the data for generation selected according to the contents of the filter processing after the update. In this case, the controller 21 may further perform the update of the contents of the filter processing on the basis of the selected data for generation and the prediction result by the degradation prediction model after the update. In this case, the update based on the prediction result by the degradation prediction model after the update is, for example, the update based on the difference between the prediction result of the degradation prediction model and the physical or chemical characteristics which the degradation of the analysis target actually includes.

Further, all or some of the functions of the model evaluation device 1 and the generating device 2 may be realized using hardware such as an application specific integrated circuit (ASIC), a programmable logic device (PLD), a field programmable gate array (FPGA), or the like. The program may be recorded on the computer-readable recording medium. The computer-readable recording medium may be a storage device, for example, a portable medium such as a flexible disk, a magneto-optic disk, a ROM, a CD-ROM, or the like, a hard disk installed in a computer system, or the like. The program may be transmitted via an electric communication line.

Further, both the model evaluation device 1 and the generating device 2 may be mounted using a plurality of information processing devices communicably connected via a network. In this case, each of the functional units provided in the controller 11 may be distributed and mounted in the plurality of information processing devices. In addition, in this case, each of the functional units provided in the controller 21 may be distributed and mounted in the plurality of information processing devices.

Further, both the communication part 12 and the input part 13 are examples of the acquisition part. In addition, the controller 11 is an example of the evaluation part. Further, the processing according to the first regulation is an example of the first processing. Further, the controller 21 is an example of the learning part. Further, the generating device 2 is an example of the filter generating device.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A model evaluation device comprising: a processor configured to:

acquire updated second auxiliary filter information in which first auxiliary filter information and second auxiliary filter information are updated through learning, the first auxiliary filter information being generated by a first processing based on data for generation which was used in generation of a mathematical model which predicts degradation of an analysis target, the second auxiliary filter information indicating a regulation for estimating a reliability of a prediction result by the mathematical model while using the first auxiliary filter information; and evaluate an accuracy of prediction by the mathematical model while using the second auxiliary filter information in a case input-scheduled data which is scheduled to be input to the mathematical model is actually input to the mathematical model, wherein the data for generation is multi-dimensional time series data showing a change over time in each of a plurality of types of variables that are expressing a state related to the degradation of the analysis target, wherein the first processing is data conversion processing of converting the multi-dimensional time series data into 1-dimensional data, wherein the data conversion processing comprises:

acquiring an accumulated time tensor that is a tensor obtained from one or plurality of pieces of the multi-dimensional time series data, and that is a tensor that shows an accumulated time for each of the pieces of multi-dimensional time series data, the accumulated time being a time in which each of the pieces of multi-dimensional time series data was present for each of a set of (i) a predetermined classification for each of the variables and (ii) a predetermined plurality of accumulated target durations which have same starting points with each other;

converting each element of the accumulated time tensor for every set consisted by each of the pieces of multi-dimensional time series data, each of the durations and each of types of degradation-related variables such that a sum of accumulated times of each of the classifications becomes 1;

obtaining a first high rank level vector on the basis of a variable probability value tensor that is an accumulated time tensor after conversion, the first high rank level vector being a 1-dimensional vector whose element is an element that satisfies a condition in which a value is $P^{th}$ value (P is a previously determined integer of 1 or more) when counted from a largest value among all elements of the variable probability value tensor and among elements having the same variable type and classification to which they belong; and obtaining a second high rank level vector on the basis of the accumulated time tensor, the second high rank level vector being a 1-dimensional vector whose element is an element that satisfies a condition in which a value is $R^{th}$ value (R is a previously determined integer of 1 or more, and R may be the same as or different from P) when counted from a largest value among all elements of the accumulated time tensor and among the elements having the same variable type and classification to which they belong in a duration that satisfies a duration condition in which a duration is within a $Q^{th}$ duration (Q is a previously determined integer of 1 or more) from a longest duration among a duration showed by an accumulated time tensor, and the first auxiliary filter information includes the first high rank level vector and the second high rank level vector.

2. The model evaluation device according to claim 1, wherein, in the learning, in addition to the data for generation, virtual data that is multi-dimensional time series data, which satisfies a first auxiliary virtual data condition, a second auxiliary virtual data condition and a third auxiliary virtual data condition, is also used, the first auxiliary virtual data condition being a condition in which a prescribed value which is a value for each classifications of the variables and in which an average value and a distribution width of values of the variables for each classifications are previously determined, the second auxiliary virtual data condition being a condition in which a value showing a magnitude of an interaction for each set of average values of the values of the variables with respect to the different types of variables is a previously determined value for each of the sets of the average values, and the third auxiliary virtual data condition being a condition in which an accumulated time of each classifications of the variables is a previously determined accumulated time for each of the variables and the classifications.

3. The model evaluation device according to claim 1, wherein, in the learning, the first auxiliary filter information and the second auxiliary filter information are updated such that reliability of an estimation result by the mathematical model with respect to data obtained by actual measurement improves a data inclusion rate that is a probability which is a predetermined reliability or more.

4. The model evaluation device according to claim 1, wherein, in the learning, the first auxiliary filter information and the second auxiliary filter information are updated such that a difference between the estimation result by the mathematical model and physical or chemical characteristics included in the degradation of the analysis target is reduced.

5. The model evaluation device according to claim 1, wherein the data for generation is multi-dimensional time series data showing a change over time in each of a plurality of types of variables that are expressing a state related to the degradation of the analysis target, the first processing is data conversion processing of converting the multi-dimensional time series data into 1-dimensional data, the data conversion processing includes processing of acquiring an accumulated time tensor that is a tensor obtained from one or plurality of pieces of the multi-dimensional time series data, and that is a tensor that shows an accumulated time for each of the pieces of multi-dimensional time series data, the accumulated time being a time in which each of the pieces of multi-dimensional time series data was present for each of a set of (i) a predetermined the classification for each of the variables and (ii) a predetermined plurality of accumulated target durations which have same starting points with each other, and variable probability value conversion processing that converts each elements of the accumulated time tensor for every sets consisted by each of the pieces of multi-dimensional time series data, each of the durations and each of types of degradation-related variables such that a sum of accumulated time of each of the classifications becomes 1, and in the learning, initial data removal processing is executed that removes a sample which belongs to a duration in which a beginning of a time series with respect to a variable probability value tensor is set as a start of the duration, the variable probability value tensor being a tensor obtained from the data for generation and being an accumulated time tensor after being converted by execution of the variable probability value conversion processing.

6. A model evaluation method executed by a computer, the model evaluation method comprising:

acquiring updated second auxiliary filter information in which first auxiliary filter information and second auxiliary filter information are updated through learning, the first auxiliary filter information being generated by a first processing based on data for generation which was used in generation of a mathematical model which predicts degradation of an analysis target, the second auxiliary filter information indicating a regulation for estimating a reliability of a prediction result by the mathematical model while using the first auxiliary filter information; and evaluating an accuracy of prediction by the mathematical model while using the second auxiliary filter information in a case input-scheduled data which is scheduled to be input to the mathematical model is actually input to the mathematical model, wherein the data for generation is multi-dimensional time series data showing a change over time in each of a plurality of types of variables that are expressing a state related to the degradation of the analysis target, wherein the first processing is data conversion processing of converting the multi-dimensional time series data into 1-dimensional data, wherein the data conversion processing comprises:

acquiring an accumulated time tensor that is a tensor obtained from one or plurality of pieces of the multi-dimensional time series data, and that is a tensor that shows an accumulated time for each of the pieces of multi-dimensional time series data, the accumulated time being a time in which each of the pieces of multi-dimensional time series data was present for each of a set of (i) a predetermined classification for each of the variables and (ii) a predetermined plurality of accumulated target durations which have same starting points with each other;

converting each element of the accumulated time tensor for every set consisted by each of the pieces of multi-dimensional time series data, each of the durations and each of types of degradation-related variables such that a sum of accumulated times of each of the classifications becomes 1;

obtaining a first high rank level vector on the basis of a variable probability value tensor that is an accumulated time tensor after conversion, the first high rank level vector being a 1-dimensional vector whose element is an element that satisfies a condition in which a value is $P^{th}$ value (P is a previously determined integer of 1 or more) when counted from a largest value among all elements of the variable probability value tensor and among elements having the same variable type and classification to which they belong; and obtaining a second high rank level vector on the basis of the accumulated time tensor, the second high rank level vector being a 1-dimensional vector whose element is an element that satisfies a condition in which a value is $R^{th}$ value (R is a previously determined integer of 1 or more, and R may be the same as or different from P) when counted from a largest value among all elements of the accumulated time tensor and among the elements having the same variable type and classification to which they belong in a duration that satisfies a duration condition in which a duration is within a $Q^{th}$ duration (Q is a previously determined integer of 1 or more) from a longest duration among a duration showed by an accumulated time tensor, and the first auxiliary filter information includes the first high rank level vector and the second high rank level vector.

7. A non-transitory computer-readable storage medium on which a program is stored to cause a computer to execute:

acquiring updated second auxiliary filter information in which first auxiliary filter information and second auxiliary filter information are updated through learning, the first auxiliary filter information being generated by a first processing based on data for generation which was used in generation of a mathematical model which predicts degradation of an analysis target, the second auxiliary filter information indicating a regulation for estimating a reliability of a prediction result by the mathematical model while using the first auxiliary filter information; and evaluating an accuracy of prediction by the mathematical model while using the second auxiliary filter information in a case input-scheduled data which is scheduled to be input to the mathematical model is actually input to the mathematical model, wherein the data for generation is multi-dimensional time series data showing a change over time in each of a plurality of types of variables that are expressing a state related to the degradation of the analysis target, wherein the first processing is data conversion processing of converting the multi-dimensional time series data into 1-dimensional data, wherein the data conversion processing comprises:

acquiring an accumulated time tensor that is a tensor obtained from one or plurality of pieces of the multi-dimensional time series data, and that is a tensor that shows an accumulated time for each of the pieces of multi-dimensional time series data, the accumulated time being a time in which each of the pieces of multi-dimensional time series data was present for each of a set of (i) a predetermined classification for each of the variables and (ii) a predetermined plurality of accumulated target durations which have same starting points with each other;

converting each element of the accumulated time tensor for every set consisted by each of the pieces of multi-dimensional time series data, each of the durations and each of types of degradation-related variables such that a sum of accumulated times of each of the classifications becomes 1;

obtaining a first high rank level vector on the basis of a variable probability value tensor that is an accumulated time tensor after conversion, the first high rank level vector being a 1-dimensional vector whose element is an element that satisfies a condition in which a value is $P^{th}$ value (P is a previously determined integer of 1 or more) when counted from a largest value among all elements of the variable probability value tensor and among elements having the same variable type and classification to which they belong; and obtaining a second high rank level vector on the basis of the accumulated time tensor, the second high rank level vector being a 1-dimensional vector whose element is an element that satisfies a condition in which a value is $R^{th}$ value (R is a previously determined integer of 1 or more, and R may be the same as or different from P) when counted from a largest value among all elements of the accumulated time tensor and among the elements having the same variable type and classification to which they belong in a duration that satisfies a duration condition in which a duration is within a $Q^{th}$ duration (Q is a previously determined integer of 1 or more) from a longest duration among a duration showed by an accumulated time tensor, and the first auxiliary filter information includes the first high rank level vector and the second high rank level vector.

* * * * *